United States Patent
Okano et al.

(10) Patent No.: US 12,430,369 B2
(45) Date of Patent: Sep. 30, 2025

(54) DOCUMENT SEARCH METHOD, DOCUMENT SEARCH SYSTEM, PROGRAM, AND NON-TRANSITORY COMPUTER READABLE STORAGE MEDIUM

(71) Applicant: SEMICONDUCTOR ENERGY LABORATORY CO., LTD., Atsugi (JP)

(72) Inventors: Tatsuya Okano, Kanagawa (JP); Shoko Saito, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 299 days.

(21) Appl. No.: 17/294,930

(22) PCT Filed: Nov. 19, 2019

(86) PCT No.: PCT/IB2019/059907
§ 371 (c)(1),
(2) Date: May 18, 2021

(87) PCT Pub. No.: WO2020/109921
PCT Pub. Date: Jun. 4, 2020

(65) Prior Publication Data
US 2022/0004570 A1  Jan. 6, 2022

(30) Foreign Application Priority Data
Nov. 30, 2018 (JP) ................................. 2018-224825

(51) Int. Cl.
*G06F 16/332* (2025.01)
*G06F 16/31* (2019.01)
(Continued)

(52) U.S. Cl.
CPC ........ *G06F 16/3323* (2019.01); *G06F 16/313* (2019.01); *G06F 16/3346* (2019.01); *G06F 40/279* (2020.01); *G06V 30/414* (2022.01)

(58) Field of Classification Search
CPC . G06F 16/3323; G06F 16/313; G06F 16/3346
(Continued)

(56) References Cited

U.S. PATENT DOCUMENTS 5,687,361 A   11/1997  Sarkar
6,801,902 B1  10/2004  David
(Continued)

FOREIGN PATENT DOCUMENTS

CN   103890755 A   6/2014
CN   104090875 A   10/2014
(Continued)

OTHER PUBLICATIONS

International Search Report (Application No. PCT/IB2019/059907) Dated Mar. 3, 2020.
(Continued)

*Primary Examiner* — Kimberly L Wilson
(74) *Attorney, Agent, or Firm* — Fish & Richardson P.C.

(57) ABSTRACT

A similar document is retrieved in units of blocks of a document. Highly accurate document search is performed. A specific text block is searched for in a plurality of text blocks created by dividing each of a plurality of search target documents. A first search text block, which is a part of a search document, is prepared; full-text search is performed by using at least some of the plurality of text blocks as a first target and using the first search text block as a search criterion to calculate first relevance of each text block included in the first target to the first search text block; a second target is determined from the first target depending on a level of the first relevance; first similarities of each
(Continued)

sentence included in the first search text block to sentences included in the second target are calculated; and at least one text block similar to the first search text block is retrieved using the first similarities.

12 Claims, 14 Drawing Sheets

(51) Int. Cl.
  *G06F 16/334* (2025.01)
  *G06F 40/279* (2020.01)
  *G06V 30/414* (2022.01)
(58) Field of Classification Search
  USPC ........................................................ 707/722
  See application file for complete search history.

(56) References Cited

U.S. PATENT DOCUMENTS

| | | | |
|---|---|---|---|
| 6,967,651 | B2 | 11/2005 | Endoh et al. |
| 7,010,519 | B2 | 3/2006 | Tada et al. |
| 7,533,078 | B2 | 5/2009 | Koskas |
| 7,734,615 | B2 | 6/2010 | Anderson et al. |
| 7,797,290 | B2 | 9/2010 | Nishino et al. |
| 7,831,588 | B2 | 11/2010 | Jones et al. |
| 8,024,341 | B1 | 9/2011 | Even-zohar et al. |
| 8,219,579 | B2 | 7/2012 | Ratiner et al. |
| 8,244,721 | B2 | 8/2012 | Morris et al. |
| 8,275,803 | B2 | 9/2012 | Brown et al. |
| 8,392,440 | B1 | 3/2013 | Papachristou et al. |
| 8,935,233 | B2 | 1/2015 | Agrawal et al. |
| 9,507,881 | B2 | 11/2016 | Aikawa. et al. |
| 2002/0169763 | A1 | 11/2002 | Tada et al. |
| 2002/0180734 | A1 | 12/2002 | Endoh et al. |
| 2004/0193584 | A1* | 9/2004 | Ogawa ................. G06F 16/334 |
| 2006/0206543 | A1 | 9/2006 | Nishino et al. |
| 2006/0271504 | A1 | 11/2006 | Anderson et al. |
| 2007/0038645 | A1 | 2/2007 | Koskas |
| 2009/0198672 | A1 | 8/2009 | Jones et al. |
| 2009/0204599 | A1 | 8/2009 | Morris et al. |
| 2009/0287678 | A1 | 11/2009 | Brown et al. |
| 2011/0258173 | A1 | 10/2011 | Ratiner et al. |
| 2011/0307497 | A1 | 12/2011 | Connor |
| 2012/0078904 | A1 | 3/2012 | Agrawal et al. |
| 2014/0236994 | A1* | 8/2014 | Aikawa ............. G06F 16/90344 707/772 |
| 2014/0324878 | A1* | 10/2014 | Kataoka ................ G06F 16/319 707/804 |
| 2016/0078102 | A1* | 3/2016 | Crouch ................. G06F 16/313 707/722 |
| 2019/0065506 | A1* | 2/2019 | Li .......................... G06N 3/042 |

FOREIGN PATENT DOCUMENTS

| | | |
|---|---|---|
| EP | 0668558 A1 * | 8/1995 |
| JP | 2004-295712 A | 10/2004 |
| JP | 2006-092135 A | 4/2006 |
| JP | 2012-104051 A | 5/2012 |
| WO | WO-2013/098886 | 7/2013 |

OTHER PUBLICATIONS

Written Opinion (Application No. PCT/IB2019/059907) Dated Mar. 3, 2020.

Chinese Office Action (Application No. 201980076644.X) Dated Mar. 19, 2025.

* cited by examiner

A1

A2, A3

A4 110(1)

120(1)

| Rank 1 | Rank 2 | Rank 3 | Rank 4 | Rank 5 | Rank 6 |
|---|---|---|---|---|---|
| TB4(1) | TB1(1) | TB11(1) | TB21(1) | TB12(1) | TB22(1) |

| Rank 7 | Rank 8 | Rank 9 | Rank 10 |
|---|---|---|---|
| TB13(1) | TB23(1) | TB24(1) | TB9(1) |

| | STB(1) | | | |
|---|---|---|---|---|
| | | STS1 | STS2 | ... | STSp |
| TB4(1) | S1 | 1 | 0.4 | ... | 0.4 |
| | S2 | 0.4 | 0.9 | ... | 0.4 |
| | S3 | 0.5 | 0.8 | ... | 0.5 |
| | ⋮ | ⋮ | ⋮ | ... | ⋮ |
| TB1(1) | S1 | 0.8 | 0.1 | ... | 0.1 |
| | S2 | 0.1 | 1 | ... | 0.3 |
| | S3 | 0.2 | 0.8 | ... | 0.1 |
| | ⋮ | ⋮ | ⋮ | ... | ⋮ |
| TB9(1) | S1 | 0.6 | 0.6 | ... | 0.5 |
| | S2 | 0.7 | 0.5 | ... | 0.5 |
| | S3 | 0.6 | 0.5 | ... | 0.6 |
| | ⋮ | ⋮ | ⋮ | ... | ⋮ |

| Rank | Block | Score |
|---|---|---|
| 1 | TB4(1) | 83.90 |
| 2 | TB1(1) | 81.22 |
| 3 | TB11(1) | 78.28 |
| 4 | TB12(1) | 77.96 |
| 5 | TB13(1) | 76.68 |
| 6 | TB24(1) | 75.45 |
| 7 | TB21(1) | 74.96 |
| 8 | TB22(1) | 74.90 |
| 9 | TB9(1) | 71.13 |
| 10 | TB23(1) | 69.41 |

| Rank | STB(1) | | | | | |
|---|---|---|---|---|---|---|
| | STS1 | | STS2 | | ⋯ | STSp | |
| 1 | TB4(1)_S1 | 1 | TB1(1)_S1 | 1 | ⋯ | TB7(1)_S8 | 1 |
| 2 | TB3(1)_S1 | 1 | TB4(1)_S2 | 0.90 | ⋯ | TB6(1)_S8 | 0.95 |
| ⋮ | ⋮ | ⋮ | | | ⋯ | ⋮ | ⋮ |
| | TB4(1)_S26 | 0.80 | | | ⋯ | | |
| | TB1(1)_S1 | 0.80 | | | ⋯ | TB9(1)_S3 | 0.60 |
| | TB9(1)_S2 | 0.70 | | | ⋯ | | |
| | | | TB9(1)_S1 | 0.60 | ⋯ | | |
| | ⋮ | ⋮ | ⋮ | ⋮ | ⋯ | ⋮ | ⋮ |
| 300 | | | | | ⋯ | | |

| Rank | Block | Score |
|---|---|---|
| 1 | TB4(1) | 87.72 |
| 2 | TB1(1) | 82.15 |
| 3 | TB7(1) | 81.49 |
| 4 | TB3(1) | 80.99 |
| 5 | TB6(1) | 80.66 |
| 6 | TB11(1) | 79.26 |
| 7 | TB12(1) | 77.39 |
| 8 | TB13(1) | 71.36 |
| 9 | TB24(1) | 70.21 |
| 10 | TB21(1) | 68.42 |

| Rank | STB(1) | STB(2) | ... | STB(w) |
|---|---|---|---|---|
| 1 | TB4(1) | TB4(2) | ... | TB10(5) |
| 2 | TB1(1) | TB7(2) | ... | TB19(5) |
| 3 | TB7(1) | TB1(2) | ... | TB79(5) |
| 4 | TB3(1) | TB20(3) | ... | TB1(5) |
| 5 | TB6(1) | TB18(9) | ... | TB4(6) |
| 6 | TB11(1) | TB11(8) | ... | TB41(4) |
| 7 | TB12(1) | TB30(2) | ... | TB28(3) |
| 8 | TB13(1) | TB20(2) | ... | TB77(5) |
| 9 | TB24(1) | TB19(2) | ... | TB24(5) |
| 10 | TB21(1) | TB21(2) | ... | TB51(5) |

DOCUMENT SEARCH METHOD, DOCUMENT SEARCH SYSTEM, PROGRAM, AND NON-TRANSITORY COMPUTER READABLE STORAGE MEDIUM

CROSS REFERENCE TO RELATED APPLICATIONS

This application is a U.S. National Phase Application under 35 U.S.C. § 371 of International Application PCT/IB2019/059907, filed on Nov. 19, 2019, which is incorporated by reference and claims the benefit of a foreign priority application filed in Japan on Nov. 30, 2018, as Application No. 2018-224825.

TECHNICAL FIELD

One embodiment of the present invention relates to a document search method, a document search system, a program, and a non-transitory computer readable storage medium.

Note that one embodiment of the present invention is not limited to the above technical field. Examples of the technical field of one embodiment of the present invention include a semiconductor device, a display device, a light-emitting device, a power storage device, a memory device, an electronic device, a lighting device, an input device (e.g., a touch sensor), an input/output device (e.g., a touch panel), a driving method thereof, and a manufacturing method thereof.

BACKGROUND ART

Document search techniques for efficiently searching a large number of documents for a target document have been actively developed. For example, Patent Document 1 discloses a search method for a similar document.

A similar document has an overall similarity to a target document in some cases, and has an extremely high similarity in one part and an extremely low similarity in another part in other cases.

In Patent Document 1, an inclusion degree is calculated as an index for determining whether a similar document is similar to a target document entirely or partly.

REFERENCE

Patent Document

[Patent Document 1] Japanese Published Patent Application No. 2004-295712

SUMMARY OF THE INVENTION

Problems to be Solved by the Invention

In patent application operations, the in-house prepared specification (specification of earlier application) is referred to or cited in preparation of a new specification (specification of later application) in some cases. In the case where the translation of the specification of the earlier application has already been prepared, the translation of the specification of the earlier application can be referred to or cited in preparation of the translation of the specification of the later application; accordingly, the time taken to translate the specification of the later application can be shortened.

In some search methods for a similar document, a document whose overall similarity to a target document is calculated to be high, even though the document is not actually similar, might be included in documents whose similarities are calculated to be high because the document has a certain degree of overall similarity. At the same time, the overall similarity of a document whose similarity is extremely high in one part and extremely low in the other parts (e.g., a document including exact match text) might be calculated to be low. For example, it is more preferable to refer to or cite the translation of the latter document than the former document.

Text search can be performed sentence by sentence to find exact match text; however, the context of the text might be cut off or translated words might be not consistent among specifications. Thus, it is desirable that similar parts can be found in units of text including a plurality of sentences, for example, in units of chapters.

Note that the number of specifications referred to in preparation of a new specification is not limited to one. For this reason, it is desirable to readily grasp not only which specification was referred to, but also which part of which specification was referred to in preparation of the new specification. This is a matter common to all documents including specifications. However, taking a note of which part of which document was referred to in preparation of a new document in detail takes time and is troublesome.

An object of one embodiment of the present invention is to provide a document search method in which a similar document can be retrieved in units of blocks of a document. Alternatively, an object of one embodiment of the present invention is to provide a document search system with which a similar document can be retrieved in units of blocks of a document. Alternatively, an object of one embodiment of the present invention is to provide a document search method in which a similar document can be retrieved in units of blocks of a document using a simple input method.

An object of one embodiment of the present invention is to provide a document search method that enables highly accurate document search. Alternatively, an object of one embodiment of the present invention is to provide a document search system that enables highly accurate document search. Alternatively, an object of one embodiment of the present invention is to achieve highly accurate document search, especially intellectual property-related document search, with a simple input method.

Note that the description of these objects does not preclude the existence of other objects. One embodiment of the present invention does not need to achieve all these objects. Other objects can be derived from the descriptions of the specification, the drawings, and the claims.

Means for Solving the Problems

One embodiment of the present invention is a document search method in which a specific text block is searched for in a plurality of text blocks created by dividing each of a plurality of search target documents. In the document search method, a first search text block, which is a part of a search document, is prepared; full-text search is performed by using at least some of the plurality of text blocks as a first target and using the first search text block as a search criterion to calculate first relevance of each text block included in the first target to the first search text block; a second target is determined from the first target depending on a level of the first relevance; first similarities of each sentence included in the first search text block to sentences included in the second target are calculated; and at least one text block similar to the first search text block is retrieved using the first similarities.

It is preferable to create a plurality of search text blocks by dividing the search document. In that case, the first search text block is preferably one of the plurality of search text blocks.

Furthermore, a second search text block, which is another part of the search document, is preferably prepared; full-text search is preferably performed by using at least some of the plurality of text blocks as a third target and using the second search text block as a search criterion to calculate second relevance of each text block included in the third target to the second search text block; a fourth target is preferably determined from the third target depending on a level of the second relevance; second similarities of each sentence included in the second search text block to sentences included in the fourth target are preferably calculated; and at least one text block similar to the second search text block is preferably retrieved using the second similarities. At this time, the first target and the third target may be the same or different from each other.

At least one text block similar to the first search text block is preferably retrieved using the first similarities with values higher than or equal to a threshold value.

One embodiment of the present invention is a document search method in which a similar text block is searched for in a plurality of text blocks created by dividing each of a plurality of search target documents for each of a plurality of search text blocks. In the document search method, a step of creating the plurality of search text blocks by dividing a search document and performing full-text search by using at least some of the plurality of text blocks as a first target and using each of the plurality of search text blocks as a search criterion to calculate relevance of each text block included in the first target to the search text block is performed; a step of determining a second target from the first target depending on a level of the relevance is performed; a step of calculating similarities of each sentence included in the search text block to sentences included in the second target is performed; and a step of retrieving at least one text block similar to the search text block using the similarities is performed.

One embodiment of the present invention is a document search method in which a specific text block is searched for in a plurality of text blocks created by dividing each of a plurality of search target documents. In the document search method, a first search text block, which is a part of a search document, is prepared; full-text search is performed by using at least some of the plurality of text blocks as a first target and using each sentence included in the first search text block as a search criterion to calculate first relevance of each sentence included in the first target to sentences included in the first search text block; a second target is determined from the sentences included in the first target depending on a level of the first relevance for each sentence included in the first search text block; first similarities of each sentence included in the first search text block to sentences included in the second target are calculated; and at least one text block similar to the first search text block is retrieved using the first similarities.

It is preferable to create a plurality of search text blocks by dividing the search document. In that case, the first search text block is preferably one of the plurality of search text blocks.

Furthermore, a second search text block, which is another part of the search document, is preferably prepared; full-text search is preferably performed by using at least some of the plurality of text blocks as a third target and using each sentence included in the second search text block as a search criterion to calculate second relevance of each sentence included in the third target to sentences included in the second search text block; a fourth target is preferably determined from the sentences included in the third target depending on a level of the second relevance for each sentence included in the second search text block; second similarities of each sentence included in the second search text block to sentences included in the fourth target are preferably calculated; and at least one text block similar to the second search text block is preferably retrieved using the second similarities. At this time, the first target and the third target may be the same or different from each other.

At least one text block similar to the first search text block is preferably retrieved using the first similarities with values higher than or equal to a threshold value.

One embodiment of the present invention is a document search method in which a similar text block is searched for in a plurality of text blocks created by dividing each of a plurality of search target documents for each of a plurality of search text blocks. In the document search method, a step of creating the plurality of search text blocks by dividing a search document and performing full-text search by using at least some of the plurality of text blocks as a first target and using each sentence included in the plurality of search text blocks as a search criterion to calculate relevance of each sentence included in the first target to sentences included in the search text block is performed; a step of determining a second target from the sentences included in the first target depending on a level of the relevance for each sentence included in the search text block is performed; a step of calculating similarities of each sentence included in the search text block to sentences included in the second target is performed; and a step of retrieving at least one text block similar to the search text block using the similarities is performed.

One embodiment of the present invention is a document search system having a function of executing any of the above document search methods.

One embodiment of the present invention is a document search system for searching for a specific text block in a plurality of text blocks created by dividing each of a plurality of search target documents. The document search system includes a processing portion; the processing portion has a function of preparing a first search text block, which is one of a plurality of search text blocks created by dividing a search document, a function of performing full-text search by using at least some of the plurality of text blocks as a first target and using the first search text block as a search criterion to calculate first relevance of each text block included in the first target to the first search text block, a function of determining a second target from the first target depending on a level of the first relevance, a function of calculating first similarities of each sentence included in the first search text block to sentences included in the second target, and a function of retrieving at least one text block similar to the first search text block using the first similarities.

One embodiment of the present invention is a program having a function of making a processing portion execute any of the above document search methods. One embodiment of the present invention is a non-transitory computer readable storage medium storing the program.

The program may be supplied to a computer by various types of transitory computer-readable storage mediums. The transitory computer-readable storage mediums include an electric signal, an optical signal, and an electromagnetic wave. The transitory computer-readable storage medium can supply the program to the computer via a wired communication path such as an electric wire or an optical fiber or a wireless communication path.

One embodiment of the present invention is a program for searching for a specific text block in a plurality of text blocks created by dividing each of a plurality of search target documents. The program makes a processing portion execute a step of preparing a first search text block, which is one of a plurality of search text blocks created by dividing a search document, a step of performing full-text search by using at least some of the plurality of text blocks as a first target and using the first search text block as a search criterion to calculate first relevance of each text block included in the first target to the first search text block, a step of determining a second target from the first target depending on a level of the first relevance, a step of calculating first similarities of each sentence included in the first search text block to sentences included in the second target, and a step of retrieving at least one text block similar to the first search text block using the first similarities. One embodiment of the present invention is a non-transitory computer readable storage medium storing the program.

As the non-transitory computer readable storage medium, various types of substantial storage mediums can be used. Examples of the non-transitory computer readable storage medium include a volatile memory such as a RAM (Random Access Memory) and a nonvolatile memory such as a ROM (Read Only Memory). In addition, a storage media drive such as a hard disc drive (HDD) or a solid state drive (SSD), a magneto-optical disk, a CD-ROM, a CD-R, and the like can be given.

Effect of the Invention

According to one embodiment of the present invention, a document search method in which a similar document can be retrieved in units of blocks of a document can be provided. According to one embodiment of the present invention, a document search system with which a similar document can be retrieved in units of blocks of a document can be provided. According to one embodiment of the present invention, a document search method in which a similar document can be retrieved in units of blocks of a document using a simple input method can be provided.

According to one embodiment of the present invention, a document search method that enables highly accurate document search can be provided. According to one embodiment of the present invention, a document search system that enables highly accurate document search can be provided. According to one embodiment of the present invention, highly accurate document search, especially intellectual property-related document search, can be achieved with a simple input method.

Note that the description of these effects does not preclude the existence of other effects. One embodiment of the present invention does not need to have all these effects. Other effects can be derived from the descriptions of the specification, the drawings, and the claims.

BRIEF DESCRIPTION OF THE DRAWINGS

FIG. 5A and FIG. 5B are diagrams illustrating an example of a document search method.

FIG. 9A and FIG. 9B are diagrams illustrating an example of a document search method.

FIG. 12 is a diagram illustrating an example of a document search method.

MODE FOR CARRYING OUT THE INVENTION

Figure 1:
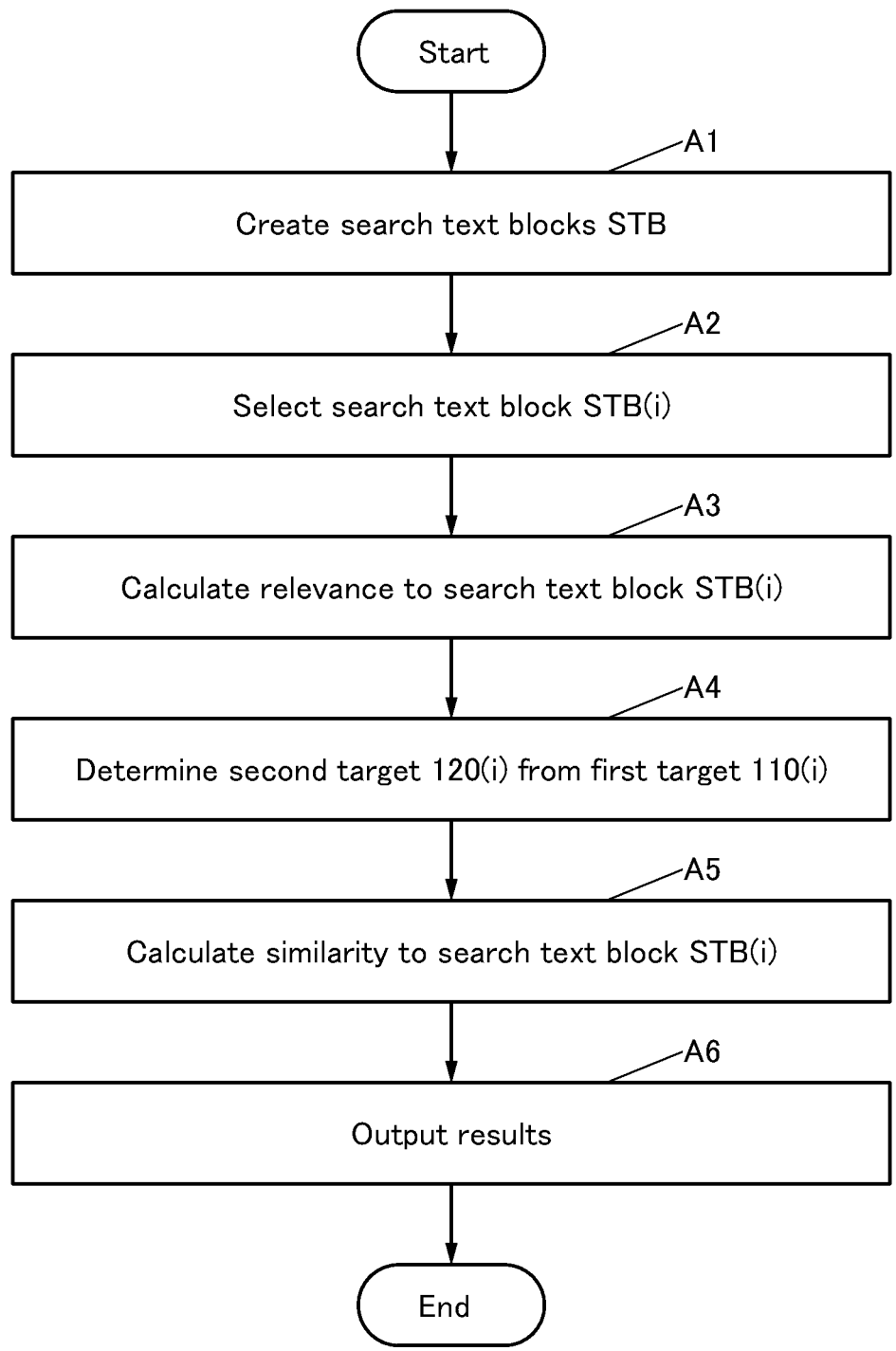
FIG. 1 is a flow chart showing an example of a document search method.

Embodiments will be described in detail with reference to the drawings. Note that the present invention is not limited to the following description. It will be readily appreciated by those skilled in the art that modes and details of the present invention can be modified in various ways without departing from the spirit and scope of the present invention. Thus, the present invention should not be construed as being limited to the description in the following embodiments.

Note that in the structures of the present invention described below, the same portions or portions having similar functions are denoted by the same reference numerals in different drawings, and description thereof is not repeated. Furthermore, the same hatch pattern is used for the portions having similar functions, and the portions are not denoted by reference numerals in some cases.

In addition, the position, size, range, or the like of each structure illustrated in drawings does not represent the actual position, size, range, or the like in some cases for easy understanding. Therefore, the disclosed invention is not necessarily limited to the position, size, range, or the like disclosed in the drawings.

Embodiment 1

In this embodiment, a document search method of one embodiment of the present invention is described with reference to FIG. 1 to FIG. 12. Note that schematic diagrams of data are just examples and are not limited thereto.

One embodiment of the present invention is a document search method in which a specific text block is searched for in a plurality of text blocks created by dividing each of a plurality of search target documents.

First, a first search text block, which is a part of a search document, is prepared.

The first search text block can be created by extracting a part of the search document, for example. Alternatively, the first search text block may be one of a plurality of search text blocks created by dividing the search document.

In the document search method of one embodiment of the present invention, the plurality of text blocks are created from the plurality of search target documents in advance, and the search text block is created from the search document at the time of search. In this manner, a text block similar to the search text block can be retrieved. Thus, the correspondence to the similar part can be grasped more easily than the case of using the entire search document as a search criterion or the case where the entire document is a search target.

Next, full-text search is performed by using at least some of the plurality of text blocks as a first target and using the first search text block as a search criterion to calculate first relevance of each text block included in the first target to the first search text block.

As the number of search target documents increases, the number of text blocks increases. In one embodiment of the present invention, text blocks serving as a search target (first target) can be determined for each search text block; thus, the amount of processing can be reduced and search speed can be improved.

Next, a second target is determined from the first target depending on the level of the first relevance.

Because the sequence of sentences or words is not taken into consideration in the full-text search, the calculated relevance is different from a similarity. On the other hand, a text block including words common to the search text block has a high level of relevance and a text block with a low similarity has a low level of relevance; thus, a target whose similarity should be calculated can be determined with high accuracy.

Next, first similarities of each sentence included in the first search text block to sentences included in the second target are calculated.

Similarity calculation processing tends to take longer time than the full-text search. In one embodiment of the present invention, similarities are calculated after the second target is determined from the first target to narrow down the target, which can shorten time required for document search.

The similarities can be calculated on the basis of letter match between sentences. Unlike in the full-text search, the sequence of words in a sentence is taken into consideration in the similarity calculation. Thus, the similarity of a sentence including words common to the sentence included in the first search text block is determined to be low if the sequence of the words is different.

Then, at least one text block similar to the first search text block is retrieved using the first similarities.

As described above, the use of the document search method of one embodiment of the present invention enables easy grasp of a description part of a document that is similar to a specific part of the search document.

In addition, the document search method of one embodiment of the present invention only requires the input of the search document and does not require the choice of search keywords, which is advantageous in that the user's load is light and in that the search result is less likely to depend on a search skill.

Furthermore, since the similarities are calculated after text blocks to be a search target are narrowed down to the first target and to the second target in this order, time required for document search can be shortened.

The full-text search may be performed by using each sentence included in the first search text block as a search criterion. In that case, the first relevance of each sentence included in the first target to sentences included in the first search text block is calculated. Then, the second target is determined from the sentences included in the first target depending on the level of the first relevance for each sentence included in the first search text block.

A text block includes a plurality of sentences. It is not always the case where most of the sentences included in the text block are similar to the sentences included in the first search text block. Thus, similarities of a number of text blocks need to be calculated to retrieve a text block with a high similarity with high accuracy; as a result, time required for similarity calculation might be long. In the case where the number of text blocks, which are the second target, is reduced to shorten the time required for similarity calculation, a text block including a sentence with a high similarity might be missed.

Hence, the first target is preferably narrowed down to the second target in units of sentence, not in units of text block. Specifically, it is preferable that a sentence with high relevance be retrieved for each sentence included in the first search text block and a target whose similarities are to be calculated be determined in units of sentence. When a target is determined in units of sentence, a sentence (and a text block) with a high similarity can be inhibited from being missed and the time required for similarity calculation can be shortened at the same time, as compared to the case where a target is determined in units of text block.

Document Search Method Example 1

FIG. 1 shows a flow chart of the document search method. As shown in FIG. 1, the document search method of one embodiment of the present invention includes six steps, Step A1 to Step A6.

Note that unless otherwise specified, even in describing a structure including a plurality of elements (documents, text blocks, sentences, or the like), an explanation is made without any variable or alphabetical letter when a common part of the elements is described. For example, when a common part of a search target document TD1, a search target document TD2, a search target document TDn, and the like is described, the term "search target document TD" is used in some cases.

[Pretreatment]

First, processing at a stage before search is described with reference to FIG. 2.

In the pretreatment, a plurality of search target documents TD are each divided to create a plurality of text blocks TB.

In the document search method of this embodiment, a plurality of documents prepared in advance are each divided into blocks. At the time of search, an input search document is also divided into blocks. Accordingly, a similar text block can be retrieved for each block of the search document.

Figure 2:
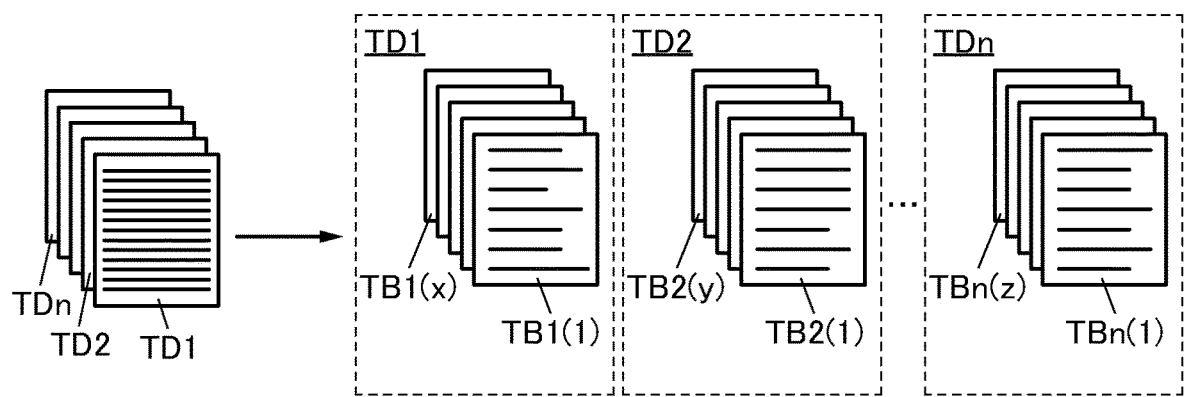
FIG. 2 is a diagram illustrating an example of processing at a stage before search.

FIG. 2 shows an example of preparing n (n is an integer greater than or equal to 2) search target documents TD.

There is no particular limitation on the search target document TD and a variety of documents can be used.

Examples of the search target document TD include an intellectual property-related document. Specific examples of the intellectual property-related document include a specification, a scope of claims, an abstract, and the like used for patent application. Examples of the intellectual property-related document also include publications such as a patent document (e.g., a published application publication or a patent publication), a utility model publication, a design publication, and a paper. Not only publications issued domestically but also those issued in foreign countries can be used as the intellectual property-related document.

Alternatively, a book, a paper, a report, a column, or other various kinds of written things including sentences may be used as the search target document TD. Alternatively, a medical document or the like may be used as the search target document TD.

The language of the document is also not particularly limited, and documents written in Japanese, English, Chinese, Korean, or other languages can be used, for example.

The search target document TD1 illustrated in FIG. 2 is divided into x (x is an integer greater than or equal to 2) text blocks (a text block TB1(1) to a text block TB1($x$)).

Furthermore, the search target document TD2 is divided into y (y is an integer greater than or equal to 2) text blocks (a text block TB2(1) to a text block TB2($y$)).

Furthermore, the search target document TDn is divided into z (z is an integer greater than or equal to 2) text blocks (a text block TBn(1) to a text block TBn(z)).

In the case where the search target document is a document including a plurality of chapters, for example, a plurality of text blocks may be created by dividing the document by chapters.

Specifically, in the case of a patent specification, the patent specification can be divided into "Background, Problem, Means, and Effect", "Embodiment 1", "Embodiment 2", and the like.

In the case of a paper, the paper can be divided into "Introduction", "Research method", "Result", "Discussion", "Conclusion", and the like.

Note that a plurality of text blocks may be created using all sentences in the search target document, or a plurality of text blocks may be created using only a necessary portion of the search target document.

For example, in the case where the search target document is a patent specification, a plurality of text blocks may be created without using "Reference Numerals".

The pretreatment is performed at least once before document search (before Step A1). The pretreatment may be performed a plurality of times depending on the purpose. For example, when the pretreatment is performed periodically to add, update, or delete a search target document, search accuracy and convenience can be improved.

In addition, an index file used for the full-text search is preferably created using the plurality of text blocks TB. Accordingly, the full-text search can be performed in a short time. The composition of the index file is not particularly limited, and data such as a character string, a document name, a text block name, or an appearance frequency can be included, for example.

The index file may contain data on whether the translation of the search target document TD (or the text block TB) in each language exists or not, for example. In that case, a criterion such as "English translation exists" or "Chinese translation exists" can be set at the time of search.

Next, the details of the six steps shown in FIG. 1 are described with reference to FIG. 3 to FIG. 5.

[Step A1: Create Search Text Blocks STB]

Figure 3A:
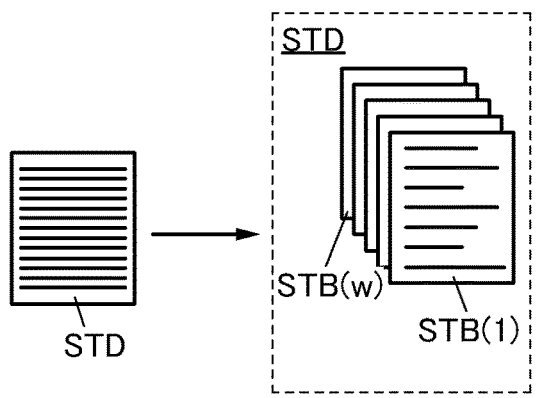
FIG. 3A, FIG. 3B, and FIG. 3C are diagrams illustrating an example of a document search method.

First, a plurality of search text blocks STB are created by dividing a search document STD (FIG. 3A).

As illustrated in FIG. 3A, the search document STD is divided into w (w is an integer greater than or equal to 2) search text blocks (a search text block STB(1) to a search text block STB(w)).

Since the input search document STD is divided into a plurality of search text blocks STB in the document search method of this embodiment, a similar document (text block TB) can be retrieved for each search text block STB.

There is no particular limitation on the search document STD and a variety of documents can be used.

Examples of the search document STD include an intellectual property-related document before translation. In that case, a similar document that has been translated can be retrieved from the search target documents TD, and the translation can be referred to or cited.

Alternatively, a book, a paper, a report, a column, or other various kinds of written things including sentences can be used as the search document STD. In that case, a similar document can be retrieved from the search target documents TD, and the search document STD can be checked for appropriation or plagiarism.

Alternatively, a medical document can be used as the search document STD. When a medical document of a similar case is retrieved using a medical document in which course of treatment is described, the document can be referred to in medical examination and treatment and which course the patient follows can be monitored.

[Step A2: Select Search Text Block STB(i)]

Next, a search text block STB(i) used for search (i is an integer greater than or equal to 1 and less than or equal to w) is selected from the w search text blocks STB.

Note that in the case where only one search text block STB is used for search, the search text block STB may be created by extracting a necessary part from the search document STD in Step A1.

In the case where search is performed for each of the plurality of search text blocks STB, sequential search may be performed (see Document search method example 3), parallel search may be performed (see Document search method example 4), or sequential processing and parallel processing may be used in combination in search.

In the document search method of this embodiment, a similar text block TB can be retrieved for each search text block STB, which allows accurate and easy grasp of a description part of the search target document TD that is similar to a specific part of the search document STD.

[Step A3: Calculate Relevance to Search Text Block STB(i)]

Next, the relevance to the search text block STB(i) is calculated.

Specifically, full-text search is performed by using the search text block STB(i) as a search criterion to calculate the relevance of each of the text blocks TB to be a search target to the search text block STB(i).

Here, the relevance of all of the text blocks TB to the search text block STB(i) may be calculated or the relevance of some of the text blocks TB to the search text block STB(i) may be calculated.

In the case of a patent specification, for example, in order to retrieve a document with similar "Background, Problem, Means, and Effect", only "Background, Problem, Means, and Effect" of the search target documents should be a search target and "Embodiment 1" and the like can be removed from the search target.

In order to retrieve a document with similar "Embodiment 1", embodiments of the search target documents can be a search target and "Background, Problem, Means, and Effect" can be removed from the search target. Furthermore, in order to retrieve a similar document whose "English translation exists", embodiments of search target documents whose "English translations exist" can be a search target.

The text blocks TB whose relevance to be calculated are automatically selected in the full-text search on the basis of the data contained in the index file, for example. Alternatively, the text blocks TB whose relevance to be calculated may be specified when the search document STD is input.

In this manner, text blocks to be a search target are changed depending on the search text block STB(i), whereby the amount of processing can be reduced and time required for document search can be shortened.

Document search method example 1 describes the case where the search text block STB(i) is used as one search criterion in the full-text search. Note that each sentence included in the search text block STB(i) may be used as a search criterion in the full-text search as described later (see Document search method example 2). In other words, the number of search criteria may be the same as the number of sentences included in the search text block STB(i).

There is no particular limitation on a full-text search method and sequential search, index search, or the like can be used.

The index search is particularly preferable because search speed is less likely to be decreased even when the number of the text blocks TB serving as a search target is large.

In the index search, the text blocks TB to be a search target are scanned in advance to prepare an index file which enables high-speed search.

There is no particular limitation on a method for extracting a character string to be contained in an index file, and word separation (separating words with spaces), morphological analysis, N-gram (also known as an N-character index method, an N-gram method, and the like), or the like can be used.

It is particularly preferable to use N-gram because N-gram is advantageous over morphological analysis in exact match search, and technical terms, new words, abbreviations, and the like are less likely to become troublesome.

It is preferable to use TF-IDF (Term Frequency-Inverse Document Frequency) to calculate the relevance, for example. A TF value represents an appearance frequency of each word in a text block, and an IDF value represents a concentration degree of a word in some text blocks. As the number of times that a word appears in one text block increases, the TF value of the word in the text block increases. The IDF value of a word that appears in many text blocks is low, while the IDF value of a word that appears only in a few text blocks is high. Calculating the product of the TF value and the IDF value of each word can provide a score indicating whether the word characterizes a text block.

Note that calculation of the relevance is not limited to the method using TF-IDF.

For example, the full-text search can be performed by using Apache Lucene, which is an open-source search engine library.

Figure 3B:
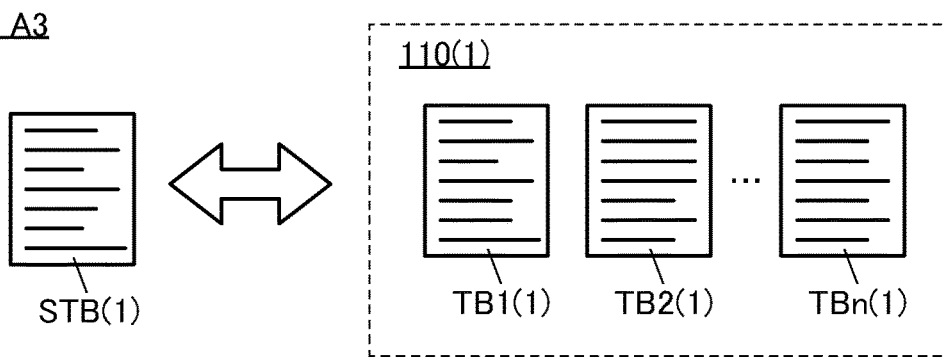

FIG. 3B illustrates an example of calculating the relevance to the search text block STB(1). In the example, first text blocks TB(1) included in the search target documents TD are the first target 110(1) serving as a search target.

[Step A4: Determine Second Target 120(i) from First Target 110(i)]

Next, a second target 120(i) is determined from the first target 110(i) depending on the level of the relevance.

There is no particular limitation on the number of the text blocks TB included in the second target 120(i). The second target 120(i) is a target whose similarities are to be calculated in the next step. Similarity calculation processing tends to take longer time than the full-text search. Similarities are calculated after the second target 120(i) is determined from the first target 110(i) to narrow down the target, whereby time required for document search can be shortened.

When a full-text search result obtained in Step A3 is sorted by the level of the relevance from the highest, for example, the text blocks TB having high relevance to the search text block STB(i) can be grasped.

Figure 3C:
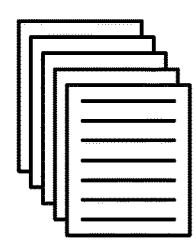

FIG. 3C illustrates an example of using top ten text blocks TB having high relevance to the search text block STB(1) as a second target 120(1). FIG. 3C illustrates, as an example, the case where a text block TB4(1) comes in first (Rank 1), the text block TB1(1) comes in second (Rank 2), and a text block TB9(1) comes in tenth (Rank 10).

[Step A5: Calculate Similarity to Search Text Block STB(i)]

Next, similarities to the search text block STB(i) are calculated. Specifically, similarities of each sentence included in the search text block STB(i) to sentences included in the second target 120(i) are calculated.

In the document search method of one embodiment of the present invention, similarities between sentences are obtained. Specifically, the similarities are preferably calculated on the basis of letter match between sentences.

The similarities can be calculated using diff, which is an algorithm for computing differences between documents, for example.

Figure 4A:
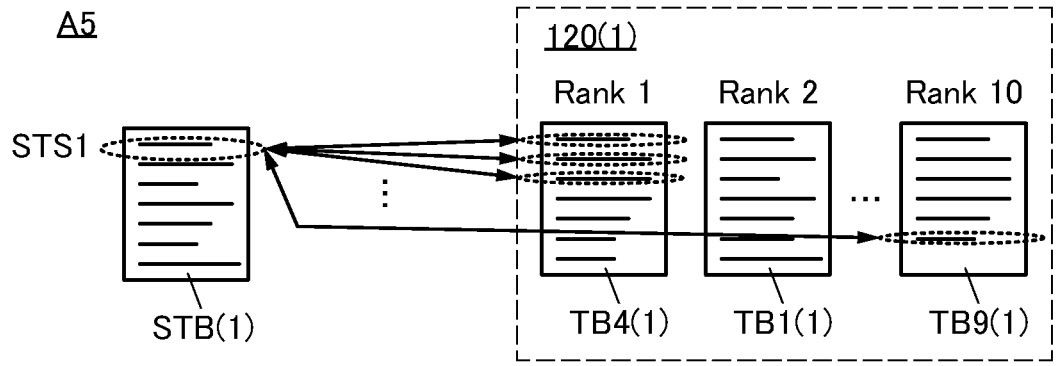
FIG. 4A, FIG. 4B, and FIG. 4C are diagrams illustrating an example of a document search method.

First, similarities of a first sentence STS1 in the search text block STB(1) to sentences included in the second target 120(1) are calculated as illustrated in FIG. 4A.

Figure 4B:
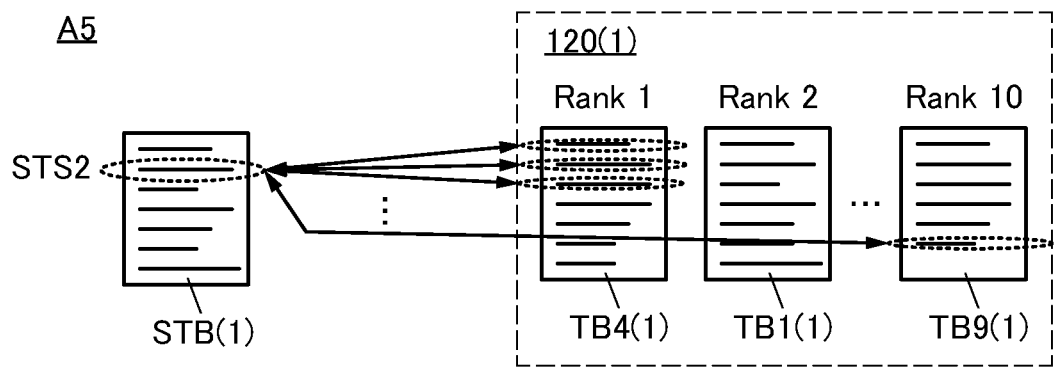

Next, similarities of a second sentence STS2 in the search text block STB(1) to the sentences included in the second target 120(1) are calculated as illustrated in FIG. 4B. In a similar manner, similarities of each sentence in the search text block STB(1) to the sentences included in the second target 120(1) are calculated.

Figure 4C:
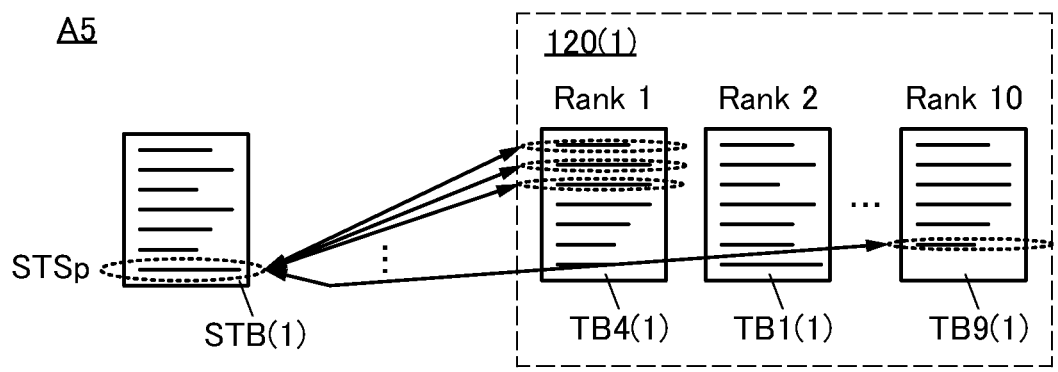

Similarity calculation is performed up to the last sentence STSp (p is an integer greater than or equal to 1) in the search text block STB(1) as illustrated in FIG. 4C, whereby similarities of all sentences included in the search text block STB(1) to the sentences included in the second target 120(1) are calculated. Note that FIG. 4C illustrates an example in which p is an integer greater than or equal to 3.

Note that similarity calculation of a plurality of sentences in the search text block STB(1) may be performed in parallel. For example, the processing illustrated in FIG. 4A, the processing illustrated in FIG. 4B, and the processing illustrated in FIG. 4C may be performed in parallel.

The text block TB similar to the search text block STB(1) can be determined using the calculated similarities.

When the sum of similarities of sentences each having the highest similarity to a sentence in the search text block STB(1) is calculated for each text block TB and the sum is divided by the number of sentences in the search text block STB(1), for example, a normalization similarity of the text block TB to the search text block STB(1) can be obtained.

As for the text block TB4(1) in FIG. 5A, a sentence having the highest similarity to the first sentence STS1 in the search text block STB(1) is a first sentence S1 (similarity is 1), a sentence having the highest similarity to the second sentence STS2 is a second sentence S2 (similarity is 0.9), and a sentence having the highest similarity to the last sentence STSp is a third sentence S3 (similarity is 0.5). These p similarities are added up and the sum is divided by the number of sentences p, whereby a normalization similarity of the text block TB4(1) to the search text block STB(1) can be obtained.

Note that a value higher than or equal to a threshold among similarities between sentences is preferably used to increase search accuracy. In the case where a threshold is 0.8, for example, since the similarity of the sentence S3 having the highest similarity to the last sentence STSp is 0.5 in the text block TB4(1) illustrated in FIG. 5A, the similarity is not used (regarded as 0) when the sum of similarities is calculated.

[Step A6: Output Results]

Then, the text blocks TB whose normalization similarities to the search text block STB(i) are high are output.

FIG. 5B illustrates an example in which the text blocks TB (Block) are listed in the descending order of the normalization similarity. In the example, the normalization similarities are represented in percentage as Score.

Because the sequence of sentences or words is not taken into consideration in the full-text search performed in Step A3, the calculated relevance is different from the similarity. The similarity calculation in Step A5 enables ten text blocks TB determined as the second target 120(1) in Step A4 (FIG. 3C) to be listed in the descending order of the similarity to the search text block STB(1) (FIG. 5B).

When the search document STD is divided into the search text blocks STB and similar text blocks are retrieved as described above, a document (text block TB) similar to the search text blocks STB can be retrieved. Accordingly, the correspondence to the similar part can be grasped more easily than the case of using the entire search document STD as a search criterion or the case where the entire document is a search target.

Furthermore, since the similarities are calculated after text blocks to be a search target are narrowed down to the first target and to the second target in this order, time required for document search can be shortened.

Document Search Method Example 2

Next, a modification example after Step A3 is described with reference to FIG. 6 to FIG. 9. Specifically, the case where each sentence included in the search text block STB(i) is used as a search criterion in full-text search is described.

[Step A3: Calculate Relevance to Search Text Block STB(i)]

In Step A3 in Document search method example 2, full-text search is performed by using each sentence included in the search text block STB(i) as a search criterion. In this manner, the relevance of sentences included in a search target to each sentence included in the search text block STB(i) is calculated.

Here, the relevance to each sentence included in the search text block STB(i) may be calculated for all of the text blocks TB or the relevance to each sentence included in the search text block STB(i) may be calculated for some of the text blocks TB.

Text blocks to be a search target are changed depending on the search text block STB(i), whereby the amount of processing can be reduced and time required for document search can be shortened.

A full-text search method and a relevance calculation method can be similar to those in Document search method example 1.

Figure 6A:
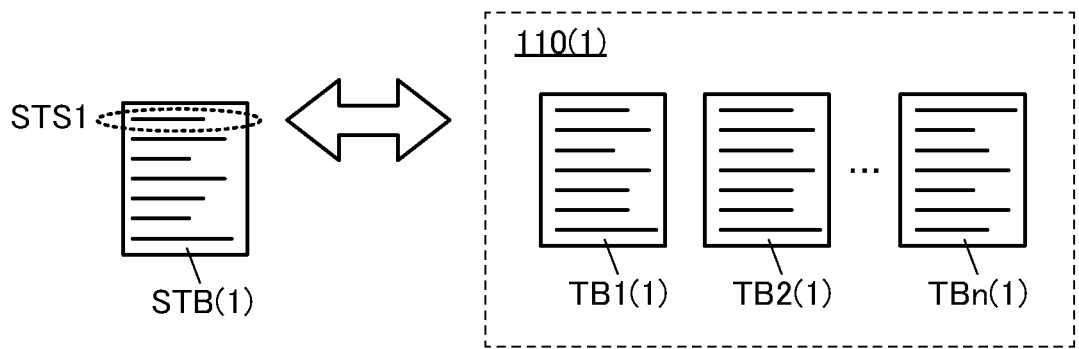
FIG. 6A, FIG. 6B, and FIG. 6C are diagrams illustrating an example of a document search method.

First, the full-text search is performed by using the first sentence STS1 in the search text block STB(1) as a search criterion as illustrated in FIG. 6A, whereby the relevance of each sentence included in the first target 110(1) to the first sentence STS1 is calculated. Note that the sentences included in the first target 110(1) are sentences contained in a plurality of text blocks TB included in the first target 110(1).

Figure 6B:
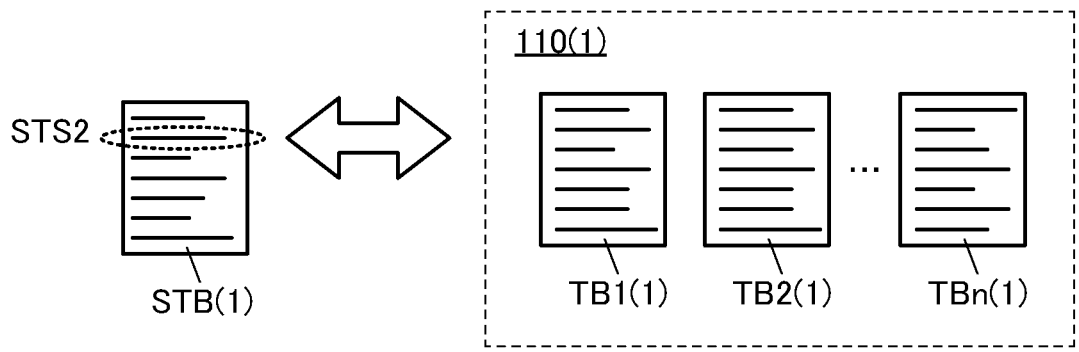

Next, the full-text search is performed by using the second sentence STS2 in the search text block STB(1) as a search criterion as illustrated in FIG. 6B, whereby the relevance of each sentence included in the first target 110(1) to the second sentence STS2 is calculated. The relevance to each sentence in the search text block STB(1) is calculated in a similar manner.

Figure 6C:
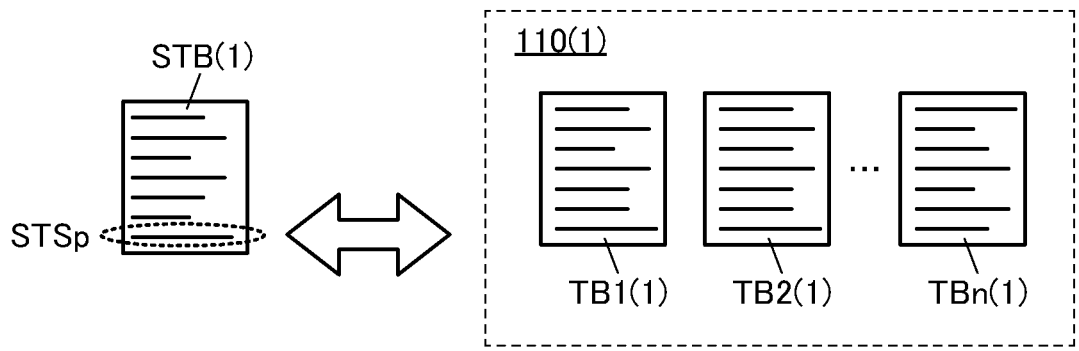

The relevance calculation is performed up to the last sentence STSp (p is an integer greater than or equal to 2) in the search text block STB(1) as illustrated in FIG. 6C, whereby the relevance of the sentences included in the first target 110(1) to each sentence included in the search text block STB(1) is calculated. Note that FIG. 6C illustrates an example in which p is an integer greater than or equal to 3.

Note that the full-text search using each sentence in the search text block STB(1) as a search criterion may be performed in parallel. For example, the processing illustrated in FIG. 6A, the processing illustrated in FIG. 6B, and the processing illustrated in FIG. 6C may be performed in parallel.

[Step A4: Determine Second Target 120(i) from First Target 110(i)]

Next, the second target 120(i) is determined from the sentences included in the first target 110(i) depending on the level of the relevance for each sentence included in the search text block STB(i).

There is no particular limitation on the number of the sentences included in the second target 120(i). The second target 120(i) is a target whose similarities are to be calculated in the next step. Similarity calculation processing tends to take longer time than the full-text search. Similarities are calculated after the second target 120(i) is determined from the first target 110(i) to narrow down the target, whereby time required for document search can be shortened.

When a full-text search result obtained in Step A3 is sorted by the level of the relevance from the highest, for example, sentences having high relevance to the sentences included in the search text block STB(i) can be grasped.

Figure 7A:
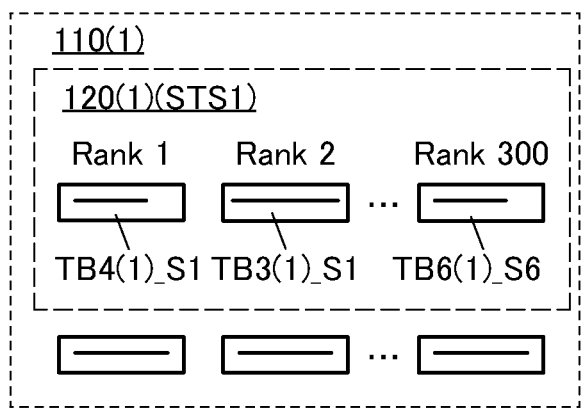
FIG. 7A, FIG. 7B, and FIG. 7C are diagrams illustrating an example of a document search method.

FIG. 7A illustrates an example of using top 300 sentences having high relevance to the first sentence STS1 in the search text block STB(1) as a second target 120(1)(STS1). FIG. 7A illustrates, as an example, the case where a first sentence TB4(1)_S1 in the text block TB4(1) comes in first (Rank 1), a first sentence TB3(1)_S1 in a text block TB3(1) comes in second (Rank 2), and a sixth sentence TB6(1)_S6 in a text block TB6(1) comes in 300th (Rank 300).

Figure 7B:
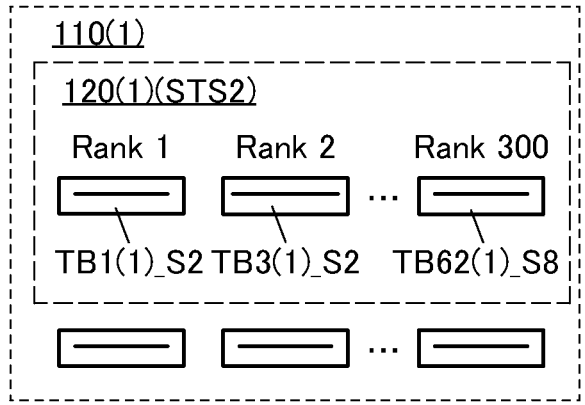

FIG. 7B illustrates an example of using top 300 sentences with high relevance to the second sentence STS2 in the search text block STB(1) as a second target 120(1)(STS2). FIG. 7B illustrates, as an example, the case where a second sentence TB1(1)_S2 in the text block TB1(1) comes in first (Rank 1), a second sentence TB3(1)_S2 in the text block TB3(1) comes in second (Rank 2), and an eighth sentence TB62(1)_S8 in a text block TB62(1) comes in 300th (Rank 300).

Figure 7C:
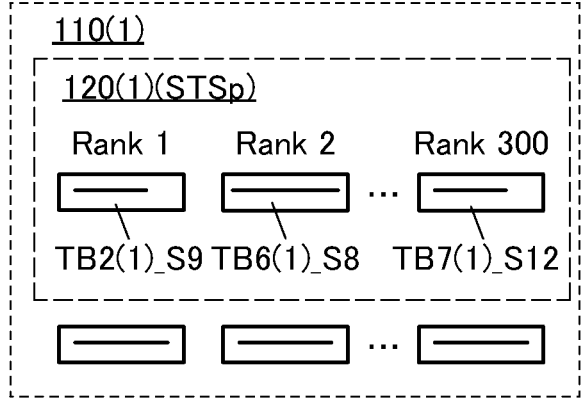

Then, a second target 120(1)(STSp), which includes top 300 sentences having high relevance to the last sentence STSp in the search text block STB(1), is determined as illustrated in FIG. 7C. FIG. 7C illustrates, as an example, the case where a ninth sentence TB2(1)_S9 in the text block TB2(1) comes in first (Rank 1), an eighth sentence TB6(1)_S8 in the text block TB6(1) comes in second (Rank 2), and a twelfth sentence TB7(1)_S12 in a text block TB7(1) comes in 300th (Rank 300). In the above manner, the second target 120(1) is determined for each of the sentences included in the search text block STB(1). Similarly, the second target 120(i) is determined from the sentences included in the first target 110(i) depending on the level of the relevance for each of the sentences included in the search text block STB(i).

[Step A5: Calculate Similarity to Search Text Block STB(i)]

Next, similarities to the search text block STB(i) are calculated. Specifically, similarities of each sentence included in the search text block STB(i) to sentences included in the second target 120(i) are calculated.

A similarity calculation method can be similar to that in Document search method example 1.

Figure 8A:
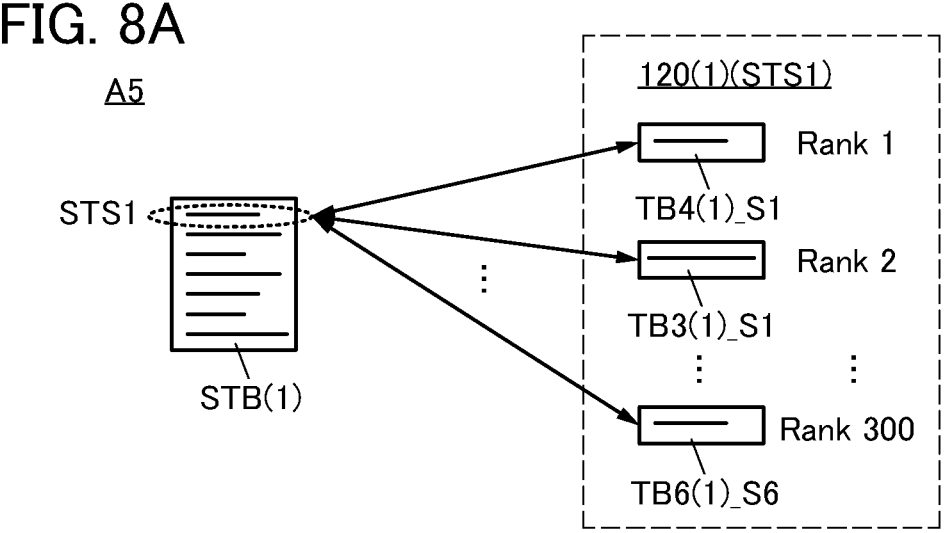
FIG. 8A, FIG. 8B, and FIG. 8C are diagrams illustrating an example of a document search method.

First, similarities of the first sentence STS1 in the search text block STB(1) to sentences included in the second target 120(1)(STS1) are calculated as illustrated in FIG. 8A.

Figure 8B:
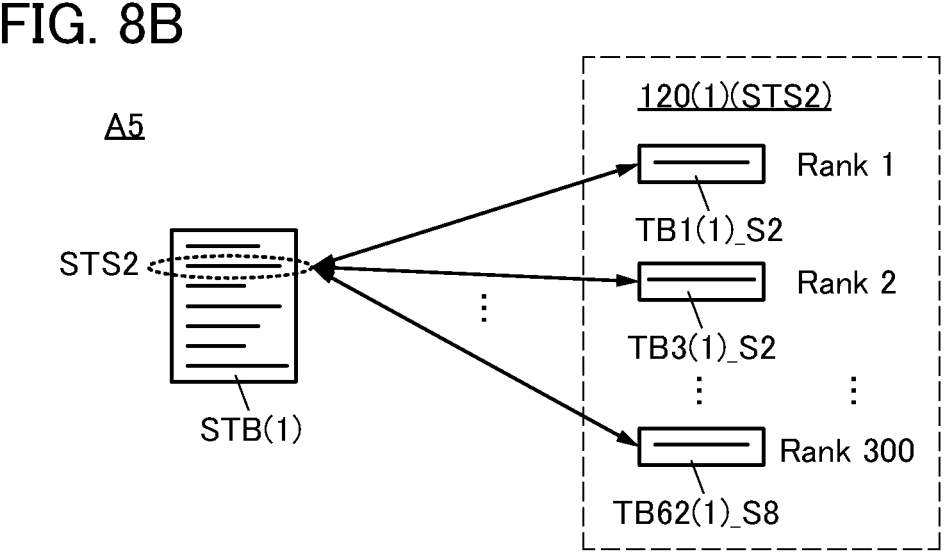

Next, similarities of the second sentence STS2 in the search text block STB(1) to sentences included in the second target 120(1)(STS2) are calculated as illustrated in FIG. 8B. In a similar manner, similarities of each sentence in the search text block STB(1) to the sentences included in the second target 120(1) are calculated.

Figure 8C:
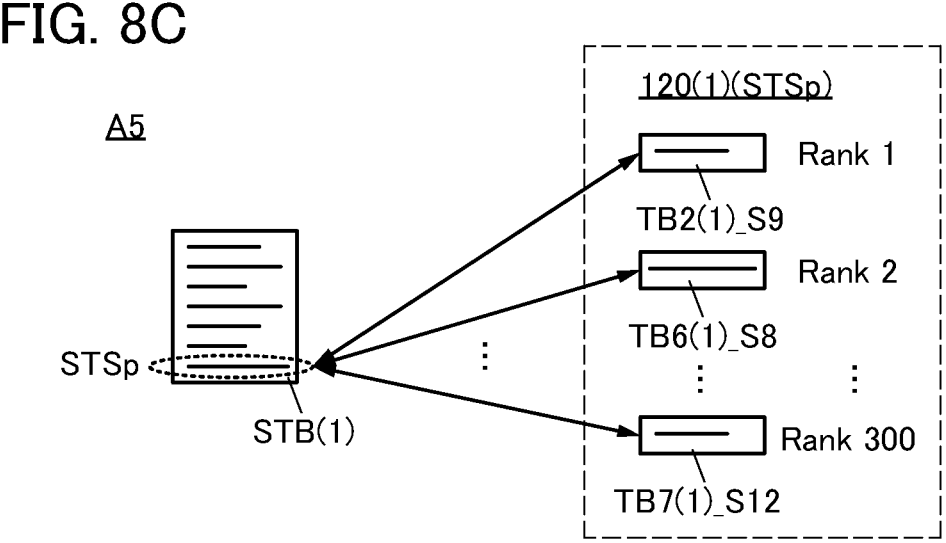

Similarity calculation is performed up to the last sentence STSp in the search text block STB(1) as illustrated in FIG. 8C, whereby similarities of all sentences included in the search text block STB(1) to the sentences included in the second target 120(1) are calculated.

Note that similarity calculation of a plurality of sentences in the search text block STB(1) may be performed in parallel. For example, the processing illustrated in FIG. 8A, the processing illustrated in FIG. 8B, and the processing illustrated in FIG. 8C may be performed in parallel.

The text block TB similar to the search text block STB(1) can be determined using the calculated similarities.

When the sum of similarities of sentences each having the highest similarity to a sentence in the search text block STB(1) is calculated for each text block TB and the sum is divided by the number of sentences in the search text block STB(1), for example, a normalization similarity of the text block TB to the search text block STB(1) can be obtained.

As for the text block TB4(1) in FIG. 9A, a sentence having the highest similarity to the first sentence STS1 in the search text block STB(1) is the first sentence S1 (similarity is 1), and a sentence having the highest similarity to the second sentence STS2 is the second sentence S2 (similarity is 0.90). In this manner, p similarities each of which is the highest for the corresponding sentence are added up and the sum is divided by the number of sentences p, whereby a normalization similarity of the text block TB4(1) to the search text block STB(1) can be obtained. Note that although the similarity of a 26th sentence S26 in the text block TB4(1) to the first sentence STS1 in the search text block STB(1) is also high (similarity of 0.80), the similarity of S26 is not used because the value is lower than that of the first sentence S1.

Note that a value higher than or equal to a threshold among similarities between sentences is preferably used to increase search accuracy. As for the text block TB9(1) illustrated in FIG. 9A, a sentence having the highest similarity to the first sentence STS1 in the search text block STB(1) is a second sentence S2 (similarity is 0.70), a sentence having the highest similarity to the second sentence STS2 is a first sentence S1 (similarity is 0.60), and a sentence having the highest similarity to the last sentence STSp is a third sentence S3 (similarity is 0.60). In the case of not using a threshold, the similarities of these three sentences are used in calculating the sum of p similarities each of which is the highest for the corresponding sentence. Meanwhile, in the case where the threshold is 0.8, for example, the similarities of these three sentences are not used (regarded as 0) when the sum of similarities is calculated because the similarities are lower than the threshold.

[Step A6: Output Results]

Then, the text blocks TB whose normalization similarities to the search text block STB(i) are high are output.

FIG. 9B illustrates an example in which the text blocks TB are listed in the descending order of the normalization similarity. In the example, the normalization similarities are represented in percentage as Score.

In Document search method example 2, sentences to be the second target 120(i) are determined from the first target 110(i) for each sentence included in the search text block STB(i). Accordingly, among sentences included in the text block TB, only a sentence having high relevance to a sentence included in the search text block STB(i) can be subjected to the similarity calculation to the sentence included in the search text block STB(i). When a target is determined in units of sentence, a sentence (and a text block) with a high similarity can be inhibited from being missed and the time required for similarity calculation can be shortened as compared to the case where a target is determined in units of text block. Furthermore, the similarity of the text block TB which is actually not similar can be prevented from being high.

With the use of Document search method example 2, the text blocks TB7(1), TB3(1), and TB6(1), which are not in the top ten in Document search method example 1 (FIG. 5B), might be in the top ten, for example (FIG. 9B).

The similarity of a text block whose similarity is extremely high in one part and extremely low in the other parts (e.g., a text block including exact match text) can be calculated to be higher in Document search method example 2 than in Document search method example 1.

Document Search Method Example 3

Figure 10:
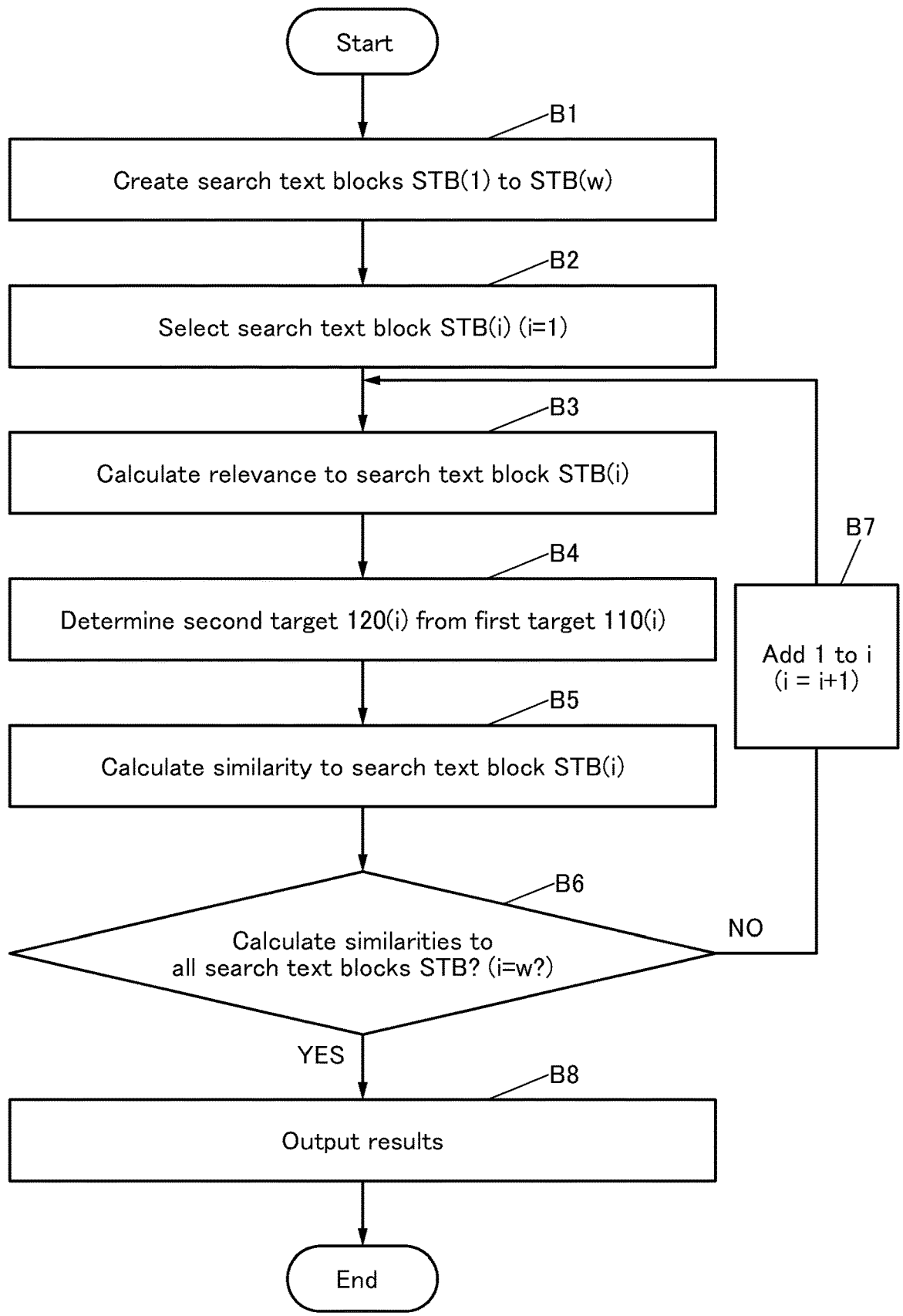
FIG. 10 is a flow chart showing an example of a document search method.

Next, a method for sequentially retrieving similar text blocks for the plurality of search text blocks STB is described. Note that although an example of retrieving similar text blocks for all search text blocks STB is described in Document search method example 3, without being limited thereto, similar text blocks may be retrieved for some of the search text blocks STB. FIG. 10 shows a flow chart of the document search method.

Note that processing at a stage before search is similar to that in Document search method example 1; thus, the description thereof is omitted.

[Step B1: Create Search Text Blocks STB(1) to STB(w)]

First, a plurality of search text blocks STB are created by dividing the search document STD. Here, an example of dividing the search document STD into w (w is an integer greater than or equal to 2) search text blocks (the search text block STB(1) to the search text block STB(w)) is described. Step B1 can be performed in a manner similar to that of Step A1 illustrated in FIG. 3A.

[Step B2: Select Search Text Block STB(i) (i=1)]

Next, the search text block STB(i) used for search (i is an integer greater than or equal to 1 and less than or equal to w) is selected from the w search text blocks STB.

As for some or all of the search text blocks STB, there is no particular limitation on the order of retrieving similar text blocks.

Document search method example 3 shows an example in which the search is sequentially performed from the search text block STB(1). Thus, i=1 is selected in Step B2.

[Step B3: Calculate Relevance to Search Text Block STB(i)]

Next, the relevance to the search text block STB(i) is calculated.

Since i=1 is selected in Step B2, the relevance to the search text block STB(1) is calculated in the first Step B3.

The first Step B3 can be performed in a manner similar to that of Step A3 illustrated in FIG. 3B.

[Step B4: Determine Second Target 120(*i*) from First Target 110(*i*)]

Next, the second target 120(*i*) is determined from the first target 110(*i*) depending on the level of the relevance.

Since i=1 is selected in Step B2, the second target 120(1) is determined from the first target 110(1) depending on the level of the relevance in the first Step B4. The first Step B4 can be performed in a manner similar to that of Step A4 illustrated in FIG. 3C.

[Step B5: Calculate Similarity to Search Text Block STB(i)]

Next, similarities to the search text block STB(i) are calculated. Specifically, similarities of each sentence included in the search text block STB(i) to sentences included in the second target 120(*i*) are calculated.

Since i=1 is selected in Step B2, the similarities to the search text block STB(1) are calculated in the first Step B5. The first Step B5 can be performed in a manner similar to that of Step A5 illustrated in FIG. 4A to FIG. 4C and FIG. 5A.

[Step B6: Calculate Similarities to all Search Text Blocks STB? (i=w?)]

The above processing from Step B3 to Step B5 is sequentially performed for all of the search text blocks STB. In the case where there is a search text block STB whose similarities are not calculated, the processing returns to Step B3 through Step B7. In the case where similarity calculation is performed for all of the search text blocks STB, the processing proceeds to Step B8.

[Step B7: Add 1 to i (i=i+1)]

When the processing returns from Step B6 to Step B3, 1 is added to i as Step B7. That is, Steps B3 to B5 for the second time are performed on the search text block STB(2). In this manner, Steps B3 to B5 are repeated until the similarities to the search text block STB(w) are calculated.

[Step B8: Output Results]

Then, the text blocks TB whose normalization similarities to each search text block STB are high are output.

FIG. 12 illustrates an example in which the text blocks TB are listed in the descending order of the normalization similarity for each search text block STB. The values indicating the levels of similarities, like Score illustrated in FIG. 5B, may also be output.

When similar text blocks are sequentially retrieved for each search text block STB and then all results are output as described above, a similar document (text block TB) can be retrieved for each search text block STB of the search document STD.

Document Search Method Example 4

Figure 11:
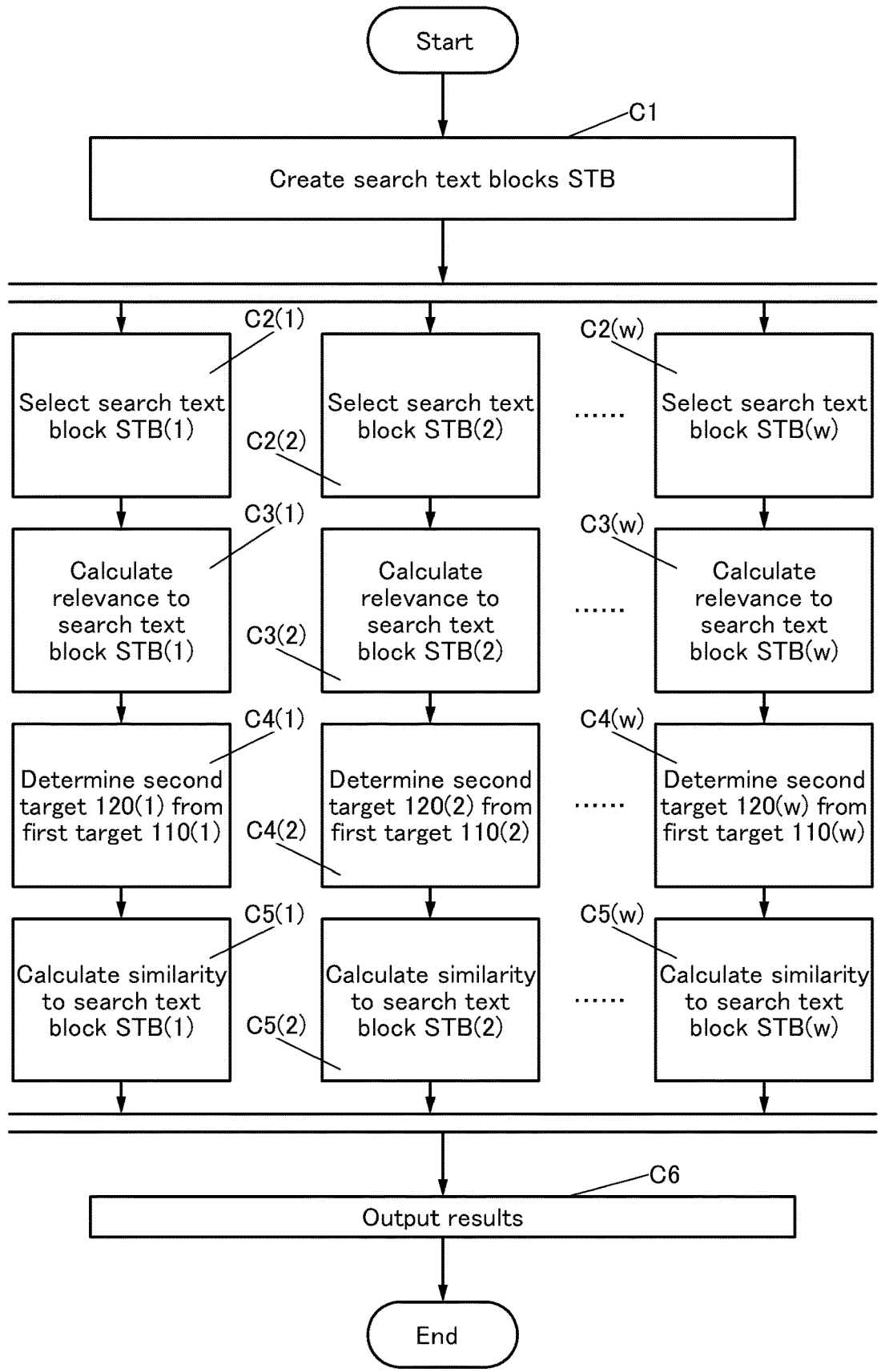
FIG. 11 is a flow chart showing an example of a document search method.

Next, a method for retrieving similar text blocks for the plurality of search text blocks STB in parallel is described. Note that although an example of retrieving similar text blocks for all search text blocks STB is described in Document search method example 4, without being limited thereto, similar text blocks may be retrieved for some of the search text blocks STB. FIG. 11 shows a flow chart of the document search method.

Note that processing at a stage before search is similar to that in Document search method example 1; thus, the description thereof is omitted.

[Step C1: Create Search Text Blocks STB]

First, a plurality of search text blocks STB are created by dividing the search document STD. Here, an example of dividing the search document STD into w (w is an integer greater than or equal to 2) search text blocks (the search text block STB(1) to the search text block STB(w)) is described. Step C1 can be performed in a manner similar to that of Step A1 illustrated in FIG. 3A.

The processing of the subsequent Steps C2 to C5 for two or more search text blocks STB can be performed in parallel. In Text search method example 4, an example in which parallel search for w search text blocks STB is performed is described.

[Step C2(*i*): Select Search Text Block STB(i)]

Next, the search text block STB(i) used for search (i is an integer greater than or equal to 1 and less than or equal to w) is selected from the w search text blocks STB.

In Step C2(1) illustrated in FIG. 11, i=1 is selected. Furthermore, i=2 is selected in Step C2(2) that is performed in parallel with Step C2(1), and i=w is selected in Step C2(*w*).

[Step C3(*i*): Calculate Relevance to Search Text Block STB(i)]

Next, the relevance to the search text block STB(i) is calculated.

In Step C3(1) illustrated in FIG. 11, the relevance to the search text block STB(1) is calculated. Step C3(1) can be performed in a manner similar to that of Step A3 illustrated in FIG. 3B.

The relevance to the search text block STB(2) is calculated in Step C3(2) that is performed in parallel with Step C3(1), and the relevance to the search text block STB(w) is calculated in Step C3(*w*).

[Step C4(*i*): Determine Second Target 120(*i*) from First Target 110(*i*)]

Next, the second target 120(*i*) is determined from the first target 110(*i*) depending on the level of the relevance.

In Step C4(1) illustrated in FIG. 11, the second target 120(1) is determined from the first target 110(1) depending on the level of the relevance. Step C4(1) can be performed in a manner similar to that of Step A4 illustrated in FIG. 3C.

A second target 120(2) is determined from a first target 110(2) depending on the level of the relevance in Step C4(2) that is performed in parallel with Step C4(1), and a second target 120(*w*) is determined from a first target 110(*w*) depending on the level of the relevance in Step C4(*w*).

[Step C5: Calculate Similarity to Search Text Block STB(i)]

Next, similarities to the search text block STB(i) are calculated. Specifically, similarities of each sentence included in the search text block STB(i) to sentences included in the second target 120(*i*) are calculated.

In Step C5(1) illustrated in FIG. 11, similarities to the search text block STB(1) are calculated. Step C5(1) can be performed in a manner similar to that of Step A5 illustrated in FIG. 4A to FIG. 4C and FIG. 5A.

The similarities to the search text block STB(2) are calculated in Step C5(2) that is performed in parallel with Step C5(1), and the similarities to the search text block STB(w) are calculated in Step C4(*w*).

[Step C6: Output Results]

Then, the text blocks TB whose normalization similarities to each search text block STB are high are output.

FIG. 12 illustrates an example in which the text blocks TB are listed in the descending order of the normalization similarity for each search text block STB. Note that the values indicating the levels of similarities, like Score illustrated in FIG. 5B, may also be output.

When similar text blocks are retrieved for search text blocks STB in parallel and then all results are output as described above, a similar document (text block TB) can be retrieved for each search text block STB of the search document STD.

When a text block similar to the search text block is retrieved in the document search method of this embodiment as described above, a description part of the search target document that is similar to a specific part of the search document can be retrieved accurately. Accordingly, the correspondence to the similar part can be grasped more easily than the case of using the entire search document as a search criterion or the case where the entire document is a search target.

In the document search method of this embodiment, a target whose similarities to the search text block are to be calculated is determined using the result of the full-text search. This allows the processing time for document search to be shortened.

This embodiment can be combined with the other embodiment as appropriate. In this specification, in the case where a plurality of structure examples are described in one embodiment, the structure examples can be combined as appropriate.

Embodiment 2

In this embodiment, a document search system of one embodiment of the present invention is described with reference to FIG. 13 and FIG. 14.

The document search system of this embodiment can perform document search using the document search method described in Embodiment 1. Specifically, text blocks prepared in advance, which serve as a search target, can be searched for a document (text block) similar to (a text block of) an input search document.

Structure Example 1 of Document Search System

Figure 13:
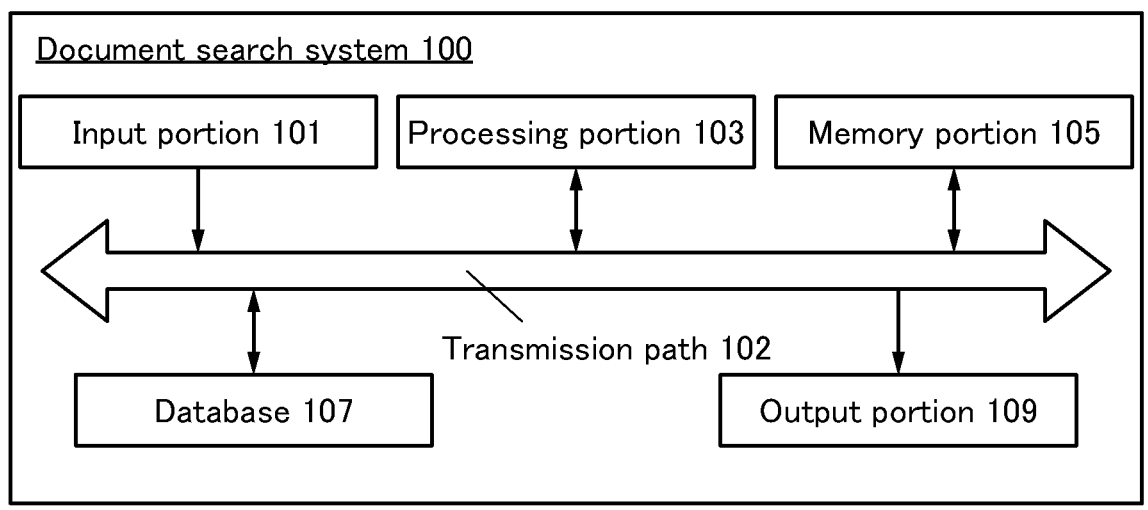
FIG. 13 is a block diagram illustrating an example of a document search system.

FIG. 13 illustrates a block diagram of a document search system 100. Note that in the drawings attached to this specification, the block diagram in which components are classified according to their functions and shown as independent blocks is illustrated; however, it is difficult to separate actual components completely according to their functions, and it is possible for one component to relate to a plurality of functions. Moreover, one function can relate to a plurality of components; for example, processing of a processing portion 103 can be executed on different servers depending on the processing.

The document search system 100 includes at least the processing portion 103. The document search system 100 illustrated in FIG. 13 further includes an input portion 101, a transmission path 102, a memory portion 105, a database 107, and an output portion 109.

[Input Portion 101]

To the input portion 101, the search document STD is supplied from the outside of the document search system 100. The search document STD supplied to the input portion 101 is supplied to the processing portion 103, the memory portion 105, or the database 107 through the transmission path 102.

[Transmission Path 102]

The transmission path 102 has a function of transmitting a variety of data. The data transmission and reception among the input portion 101, the processing portion 103, the memory portion 105, the database 107, and the output portion 109 can be performed through the transmission path 102. For example, data such as the search document STD, the search text block STB, the search target document TD, and the text block TB are transmitted and received through the transmission path 102.

[Processing Portion 103]

The processing portion 103 has a function of performing an arithmetic operation with the use of the data supplied from the input portion 101, the memory portion 105, the database 107, or the like. The processing portion 103 can supply an arithmetic operation result to the memory portion 105, the database 107, the output portion 109, or the like.

A transistor whose channel formation region contains a metal oxide is preferably used in the processing portion 103. The transistor has an extremely low off-state current; therefore, with the use of the transistor as a switch for holding electric charge (data) which flows into a capacitor functioning as a memory element, a long data retention period can be ensured. When at least one of a register and a cache memory included in the processing portion 103 has such a feature, the processing portion 103 can be operated only when needed, and otherwise can be off while data processed immediately before turning off the processing portion 103 is stored in the memory element. Accordingly, normally-off computing is possible and the power consumption of the document search system can be reduced.

In this specification and the like, a transistor containing an oxide semiconductor or a metal oxide in its channel formation region is referred to as an Oxide Semiconductor transistor or an OS transistor. A channel formation region of an OS transistor preferably contains a metal oxide.

In this specification and the like, a metal oxide is an oxide of metal in a broad sense. Metal oxides are classified into an oxide insulator, an oxide conductor (including a transparent oxide conductor), an oxide semiconductor (also simply referred to as an OS), and the like. For example, in the case where a metal oxide is used in a semiconductor layer of a transistor, the metal oxide is referred to as an oxide semiconductor in some cases. That is to say, in the case where a metal oxide has at least one of an amplifying function, a rectifying function, and a switching function, the metal oxide can be called a metal oxide semiconductor, or OS for short.

The metal oxide contained in the channel formation region preferably contains indium (In). When the metal oxide contained in the channel formation region is a metal oxide containing indium, the carrier mobility (electron mobility) of the OS transistor increases. The metal oxide contained in the channel formation region is preferably an oxide semiconductor containing an element M The element M is preferably aluminum (Al), gallium (Ga), or tin (Sn). Other elements that can be used as the element M are boron (B), silicon (Si), titanium (Ti), iron (Fe), nickel (Ni), germanium (Ge), yttrium (Y), zirconium (Zr), molybdenum (Mo), lanthanum (La), cerium (Ce), neodymium (Nd), hafnium (Hf), tantalum (Ta), tungsten (W), and the like. Note that it is sometimes acceptable to use a plurality of the above-described elements in combination as the element M. The element M is an element having high bonding energy with oxygen, for example. The element M is an element having higher bonding energy with oxygen than indium, for example. The metal oxide contained in the channel formation region preferably contains zinc (Zn). The metal oxide containing zinc is easily crystallized in some cases.

The metal oxide contained in the channel formation region is not limited to a metal oxide containing indium. The semiconductor layer may be a metal oxide that does not contain indium and contains zinc, a metal oxide that contains gallium, a metal oxide that contains tin, or the like, e.g., a zinc tin oxide or a gallium tin oxide.

Furthermore, a transistor containing silicon in a channel formation region may be used in the processing portion 103.

In the processing portion 103, a transistor containing an oxide semiconductor in a channel formation region and a transistor containing silicon in a channel formation region are preferably used in combination.

The processing portion 103 includes, for example, an arithmetic circuit, a central processing unit (CPU), or the like.

The processing portion 103 may include a microprocessor such as a DSP (Digital Signal Processor) or a GPU (Graphics Processing Unit). The microprocessor may be constructed with a PLD (Programmable Logic Device) such as an FPGA (Field Programmable Gate Array) or an FPAA (Field Programmable Analog Array). The processing portion 103 can interpret and execute instructions from various programs with the use of a processor to process various kinds of data and control programs. The programs to be executed by the processor are stored in at least one of a memory region of the processor and the memory portion 105.

The processing portion 103 may include a main memory. The main memory includes at least one of a volatile memory such as a RAM and a nonvolatile memory such as a ROM.

A DRAM (Dynamic Random Access Memory), an SRAM (Static Random Access Memory), or the like is used as the RAM, for example, and a memory space is virtually assigned as a work space for the processing portion 103 to be used. An operating system, an application program, a program module, program data, a look-up table, and the like which are stored in the memory portion 105 are loaded into the RAM for execution. The data, program, and program module which are loaded into the RAM are each directly accessed and operated by the processing portion 103.

In the ROM, a BIOS (Basic Input/Output System), firmware, and the like for which rewriting is not needed can be stored. As examples of the ROM, a mask ROM, an OTPROM (One Time Programmable Read Only Memory), an EPROM (Erasable Programmable Read Only Memory), and the like can be given. As the EPROM, a UV-EPROM (Ultra-Violet Erasable Programmable Read Only Memory) which can erase stored data by ultraviolet irradiation, an EEPROM (Electrically Erasable Programmable Read Only Memory), a flash memory, and the like can be given.

[Memory Portion 105]

The memory portion 105 has a function of storing a program to be executed by the processing portion 103. The memory portion 105 may have a function of storing an arithmetic operation result generated by the processing portion 103, data input to the input portion 101, and the like.

The memory portion 105 includes at least one of a volatile memory and a nonvolatile memory. For example, the memory portion 105 may include a volatile memory such as a DRAM or an SRAM. For example, the memory portion 105 may include a nonvolatile memory such as an ReRAM (Resistive Random Access Memory), a PRAM (Phase change Random Access Memory), an FeRAM (Ferroelectric Random Access Memory), or an MRAM (Magnetoresistive Random Access Memory), or a flash memory. The memory portion 105 may include a storage media drive such as a hard disc drive (HDD) or a solid state drive (SSD).

[Database 107]

The database 107 has at least a function of storing data such as the search target document TD and the text block TB. The database 107 may have a function of storing an arithmetic operation result generated by the processing portion 103 and data input to the input portion 101. Note that the memory portion 105 and the database 107 are not necessarily separated from each other. For example, the document search system may include a storage unit that has both the functions of the memory portion 105 and the database 107.

Note that memories included in the processing portion 103, the memory portion 105, and the database 107 can each be regarded as an example of a non-transitory computer readable storage medium.

[Output Portion 109]

The output portion 109 has a function of supplying data to the outside of the document search system 100. For example, an arithmetic operation result in the processing portion 103 can be supplied to the outside.

Structure Example 2 of Document Search System

Figure 14:
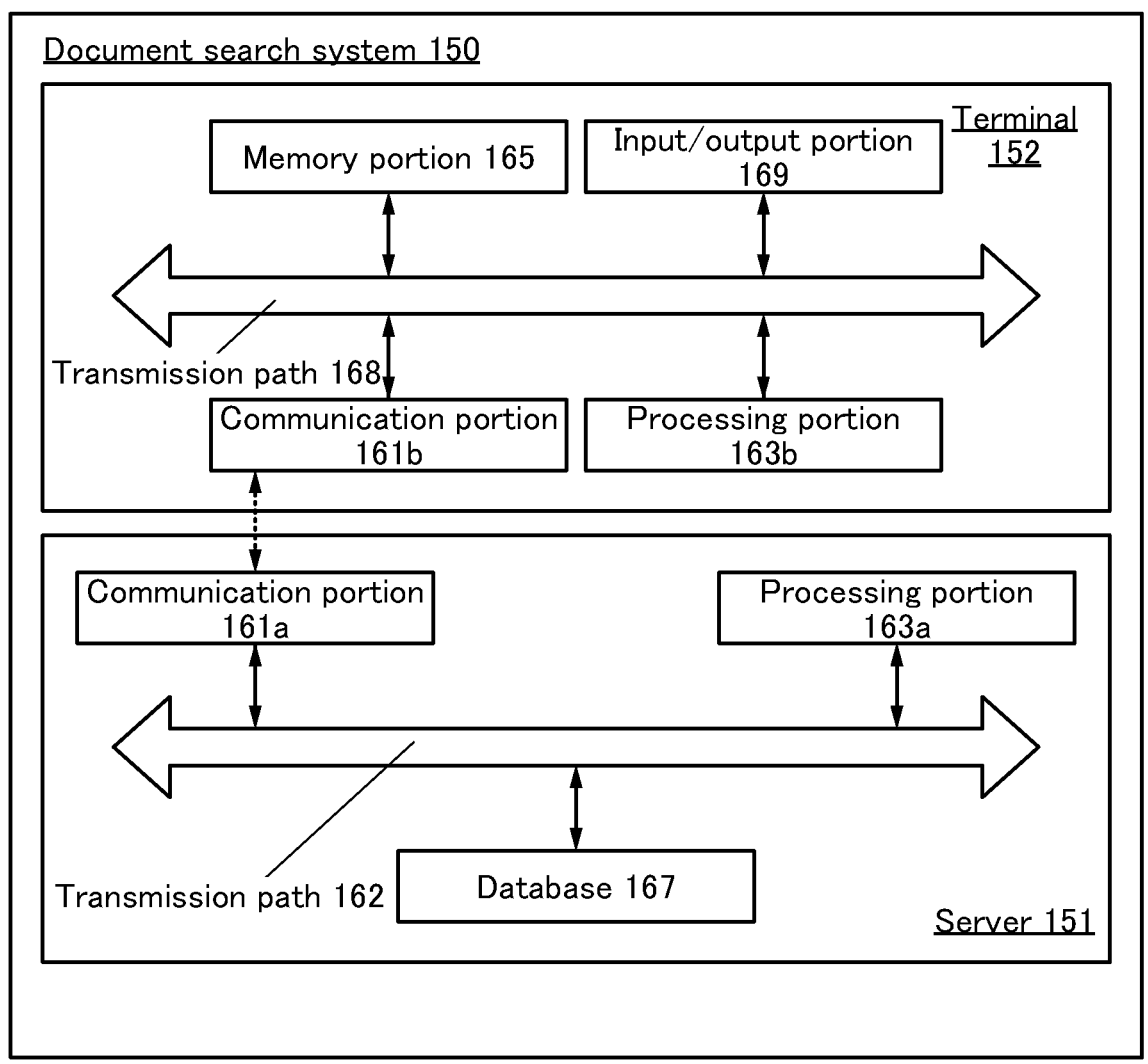
FIG. 14 is a block diagram illustrating an example of a document search system.

FIG. 14 is a block diagram of a document search system 150. The document search system 150 includes a server 151 and a terminal 152 (such as a personal computer).

The server 151 includes a communication portion 161a, a transmission path 162, a processing portion 163a, and a database 167. The server 151 may further include a memory portion, an input/output portion, or the like although not illustrated in FIG. 14.

The terminal 152 includes a communication portion 161b, a transmission path 168, a processing portion 163b, a memory portion 165, and an input/output portion 169. The terminal 152 may further include a database or the like although not illustrated in FIG. 14.

A user of the document search system 150 inputs the search document STD from the terminal 152 to the server 151. The search document STD is transmitted from the communication portion 161b to the communication portion 161a.

The search document STD received by the communication portion 161a is stored in the database 167 or a memory portion (not illustrated) through the transmission path 162. Alternatively, the search document STD may be directly supplied to the processing portion 163a from the communication portion 161a.

Creation of the search text block STB, relevance calculation, and similarity calculation described in Embodiment 1 each requires high processing capacity. The processing portion 163a included in the server 151 has higher processing capability than the processing portion 163b included in the terminal 152. Thus, the processings are each preferably performed by the processing portion 163a.

The processing portion 163a generates a search result. The search result is stored in the database 167 or the memory portion (not illustrated) through the transmission path 162. Alternatively, the search result may be directly supplied to the communication portion 161a from the processing portion 163a. After that, the search result is output from the server 151 to the terminal 152. The search result is transmitted from the communication portion 161a to the communication portion 161b.

[Input/Output Portion 169]

Data is supplied from the outside of the document search system 150 to the input/output portion 169. The input/output portion 169 has a function of supplying data to the outside of the document search system 150. Note that an input portion and an output portion may be separated from each other as in the document search system 100.

[Transmission Path 162 and Transmission Path 168]

The transmission path 162 and the transmission path 168 have a function of transmitting data. The communication portion 161a, the processing portion 163a, and the database 167 can transmit and receive data through the transmission path 162. The communication portion 161b, the processing portion 163b, the memory portion 165, and the input/output portion 169 can transmit and receive data through the transmission path 168.

[Processing Portion 163a and Processing Portion 163b]

The processing portion 163a has a function of performing an arithmetic operation with the use of data supplied from the communication portion 161a, the database 167, or the like. The processing portion 163b has a function of performing an arithmetic operation with the use of data supplied from the communication portion 161b, the memory portion 165, the input/output portion 169, or the like. The description of the processing portion 103 can be referred to for the processing portion 163a and the processing portion 163b. The processing portion 163a preferably has higher processing capacity than the processing portion 163b.

[Memory Portion 165]

The memory portion 165 has a function of storing a program to be executed by the processing portion 163b. The memory portion 165 has a function of storing an arithmetic operation result generated by the processing portion 163b, data input to the communication portion 161b, data input to the input/output portion 169, and the like.

[Database 167]

The database 167 has a function of storing the search target document TD and the text block TB. The database 167 may have a function of storing an arithmetic operation result generated by the processing portion 163a, data input to the communication portion 161a, and the like. Alternatively, the server 151 may include a memory portion in addition to the database 167, and the memory portion may have a function of storing an arithmetic operation result generated by the processing portion 163a, data input to the communication portion 161a, and the like.

[Communication Portion 161a and Communication Portion 161b]

The server 151 and the terminal 152 can transmit and receive data with the use of the communication portion 161a and the communication portion 161b. As the communication portion 161a and the communication portion 161b, a hub, a router, a modem, or the like can be used. Data may be transmitted or received through wire communication or wireless communication (e.g., radio waves or infrared rays).

This embodiment can be combined with the other embodiment as appropriate.

REFERENCE NUMERALS

S1: sentence, S2: sentence, S3: sentence, S26: sentence, STB: search text block, STD: search document, STS1: sentence, STS2: sentence, STSp: sentence, TB: text block, TB1: text block, TB2: text block, TB3: text block, TB4: text block, TB6: text block, TB7: text block, TB9: text block, TB62: text block, TD: search target document, TD1: search target document, TD2: search target document, TDn: search target document, 100: document search system, 101: input portion, 102: transmission path, 103: processing portion, 105: memory portion, 107: database, 109: output portion, 110: first target, 110(i): first target, 120: second target, 120(i): second target, 150: document search system, 151: server, 152: terminal, 161a: communication portion, 161b: communication portion, 162: transmission path, 163a: processing portion, 163b: processing portion, 165: memory portion, 167: database, 168: transmission path, 169: input/output portion

The invention claimed is:

1. A document search method, comprising the step of:
selecting a first search criterion for existence of a translation,
preparing a first search text block from a part of a search document;
calculating first relevance of each text block included in a first target to the first search text block by performing full-text search using the first search text block as a second search criterion;
determining a second target from the first target depending on a level of the first relevance;
calculating first similarities of each sentence included in the first search text block to sentences included in the second target;
obtaining a normalization similarity by dividing a sum of the first similarities by a number of sentences; and
retrieving at least one text block similar to the first search text block using the normalization similarity,
wherein the first target is at least some of a plurality of text blocks created from a plurality of search target documents,
wherein the first similarities take into consideration a sequence of words in the sentences,
wherein the first similarities are configured to be determined to be low when the sequence of the words is different, and
wherein the first similarities are used with values higher than or equal to a threshold value.

2. The document search method according to claim 1, wherein a plurality of search text blocks are created by dividing the search document, and
wherein the first search text block is one of the plurality of search text blocks.

3. The document search method according to claim 1, wherein a second search text block, which is another part of the search document, is prepared,
wherein full-text search is performed by using at least some of the plurality of text blocks as a third target and using the second search text block as a search criterion to calculate second relevance of each text block included in the third target to the second search text block,
wherein a fourth target is determined from the third target depending on a level of the second relevance,
wherein second similarities of each sentence included in the second search text block to sentences included in the fourth target are calculated, and
wherein at least one text block similar to the second search text block is retrieved using the second similarities.

4. The document search method according to claim 3, wherein the first target is the same as the third target.

5. A document search method, comprising the step of:
selecting a first search criterion for existence of a translation,
creating a plurality of search text blocks by dividing a search document and performing full-text search by using at least some of a plurality of text blocks as a first target and using each of the plurality of search text blocks as a second search criterion to calculate relevance of each text block included in the first target to the search text block;

determining a second target from the first target depending on a level of the relevance;
calculating similarities of each sentence included in the search text block to sentences included in the second target;
obtaining a normalization similarity by dividing a sum of the similarities by a number of sentences; and
retrieving at least one text block similar to the search text block using the normalization similarity,
wherein the normalization similarity takes into consideration a sequence of words in the sentences,
wherein the similarities are configured to be determined to be low when the sequence of the words is different, and
wherein the similarities are used with values higher than or equal to a threshold value.

6. A document search method, comprising the step of:
selecting a first search criterion for existence of a translation,
preparing a first search text block from a part of a search document;
calculating first relevance of each sentence included in a first target to sentences included in the first search text block by performing full-text search using the first search text block as a second search criterion;
determining a second target from the sentences included in the first target depending on a level of the first relevance for each sentence included in the first search text block;
calculating first similarities of each sentence included in the first search text block to sentences included in the second target;
obtaining a normalization similarity by dividing a sum of the first similarities by a number of sentences; and
retrieving at least one text block similar to the first search text block using the normalization similarity,
wherein the first target is at least some of a plurality of text blocks created from a plurality of search target documents,
wherein the first similarities take into consideration a sequence of words in the sentences,
wherein the first similarities are configured to be determined to be low when the sequence of the words is different, and
wherein the first similarities are used with values higher than or equal to a threshold value.

7. The document search method according to claim 6,
wherein a plurality of search text blocks are created by dividing the search document, and
wherein the first search text block is one of the plurality of search text blocks.

8. The document search method according to claim 6,
wherein a second search text block, which is another part of the search document, is prepared,
wherein full-text search is performed by using at least some of the plurality of text blocks as a third target and using each sentence included in the second search text block as a third search criterion to calculate second relevance of each sentence included in the third target to sentences included in the second search text block,
wherein a fourth target is determined from the sentences included in the third target depending on a level of the second relevance for each sentence included in the second search text block,
wherein second similarities of each sentence included in the second search text block to sentences included in the fourth target are calculated, and
wherein at least one text block similar to the second search text block is retrieved using the second similarities.

9. The document search method according to claim 8, wherein the first target is the same as the third target.

10. A document search method, comprising the step of:
selecting a first search criterion for existence of a translation,
creating a plurality of search text blocks by dividing a search document and performing full-text search by using at least some of the plurality of search text blocks as a first target and using each sentence included in a plurality of search text blocks as a second search criterion to calculate relevance of each sentence included in the first target to sentences included in the search text block;
determining a second target from the sentences included in the first target depending on a level of the relevance for each sentence included in the search text block;
calculating similarities of each sentence included in the search text block to sentences included in the second target;
obtaining a normalization similarity by dividing a sum of the similarities by a number of sentences; and
retrieving at least one text block similar to the search text block using the normalization similarity,
wherein the similarities take into consideration a sequence of words in the sentences,
wherein the similarities are configured to be determined to be low when the sequence of the words is different, and
wherein the similarities are used with values higher than or equal to a threshold value.

11. A document search system comprising a processing portion comprising a processing circuit,
wherein the processing portion is configured to select a first search criterion for existence of a translation,
wherein the processing portion is configured to prepare a first search text block, which is one of a plurality of search text blocks created by dividing a search document,
wherein the processing portion is configured to perform full-text search by using at least some of the plurality of search text blocks as a first target and using the first search text block as a second search criterion to calculate first relevance of each text block included in the first target to the first search text block,
wherein the processing portion is configured to determine a second target from the first target depending on a level of the first relevance,
wherein the processing portion is configured to calculate first similarities of each sentence included in the first search text block to sentences included in the second target,
wherein the processing portion is configured to obtain a normalization similarity by dividing a sum of the first similarities by a number of sentences,
wherein the processing portion is configured to retrieve at least one text block similar to the first search text block using the normalization similarity,
wherein the first similarities take into consideration a sequence of words in the sentences,
wherein the first similarities are configured to be determined to be low when the sequence of the words is different, and
wherein the first similarities are used with values higher than or equal to a threshold value.

12. A document search method, comprising the steps of:
selecting a first search criterion for existence of a translation,
preparing a first search text block, which is one of a plurality of search text blocks created by dividing a search document;
performing full-text search by using at least some of the plurality of search text blocks as a first target and using the first search text block as a second search criterion to calculate first relevance of each text block included in the first target to the first search text block;
determining a second target from the first target depending on a level of the first relevance;
calculating first similarities of each sentence included in the first search text block to sentences included in the second target;
obtaining a normalization similarity by dividing a sum of the first similarities by a number of sentences; and
retrieving at least one text block similar to the first search text block using the normalization similarity,
wherein the first similarities take into consideration a sequence of words in the sentences,
wherein the first similarities are configured to be determined to be low when the sequence of the words is different,
wherein the first similarities are used with values higher than or equal to a threshold value.

* * * * *